US008002534B2

(12) United States Patent  
Lowry et al.

(10) Patent No.: US 8,002,534 B2  
(45) Date of Patent: Aug. 23, 2011

(54) METHODS AND APPARATUSES FOR CUTTING DOUGH UTILIZING A SHAPED OPENING

(76) Inventors: Stanley N. Lowry, Kernersville, NC (US); Garcie M. McCall, Germanton, NC (US); Christopher T. Roth, Kernersville, NC (US)

( * ) Notice: Subject to any disclaimer, the term of this patent is extended or adjusted under 35 U.S.C. 154(b) by 1023 days.

(21) Appl. No.: 11/227,743

(22) Filed: Sep. 15, 2005
(Under 37 CFR 1.47)

(65) Prior Publication Data

US 2006/0165860 A1    Jul. 27, 2006

Related U.S. Application Data

(60) Provisional application No. 60/609,929, filed on Sep. 15, 2004.

(51) Int. Cl.
*B28B 17/00* (2006.01)
*B29C 47/00* (2006.01)
*A23L 1/00* (2006.01)

(52) U.S. Cl. ............... 425/192 R; 425/461; 425/376.1; 425/311; 426/516; 426/518

(58) Field of Classification Search ............. 425/192 R, 425/191, 376.1, 461, 311, 287; 426/516, 426/518
See application file for complete search history.

(56) References Cited

U.S. PATENT DOCUMENTS

| RE19,557 | E | | 5/1935 | Baumann |
|---|---|---|---|---|
| 2,489,667 | A | * | 11/1949 | Pennell ........................ 83/420 |
| 3,362,355 | A | | 1/1968 | Roth |
| 3,455,254 | A | | 7/1969 | Gebhardt |
| 3,695,802 | A | | 10/1972 | Gilmore |
| 4,015,518 | A | | 4/1977 | Roth et al. |
| 4,025,260 | A | | 5/1977 | Neel |
| 4,259,042 | A | * | 3/1981 | Heatherly .................... 417/566 |
| 4,442,131 | A | | 4/1984 | Nagy et al. |
| 4,466,933 | A | * | 8/1984 | Huggard ........................ 264/54 |
| 4,702,687 | A | | 10/1987 | Wheeler et al. |
| 4,731,006 | A | * | 3/1988 | Freda et al. .................. 425/190 |
| 5,435,714 | A | | 7/1995 | Van Lengerich et al. |
| 5,591,472 | A | | 1/1997 | Cummins |
| 5,620,713 | A | | 4/1997 | Rasmussen |
| 5,773,043 | A | | 6/1998 | Hunter |

(Continued)

FOREIGN PATENT DOCUMENTS

WO    WO9839975    9/1998

(Continued)

OTHER PUBLICATIONS

Non-final Office Action for U.S. Appl. No. 11/227,755, filed Sep. 15, 2005 mailed Apr. 23, 2008.

(Continued)

*Primary Examiner* — Maria Veronica D Ewald
(74) *Attorney, Agent, or Firm* — Kilpatrick Townsend & Stockton LLP

(57) ABSTRACT

Methods and apparatuses for cutting dough are described. One described dough cutting apparatus comprises a barrel having two ends, a removable die comprising a shaped opening, the removable die adapted to be coupled to a first end of the barrel, and a knife adapted to cut dough extruded from the shaped opening. In one illustrative method for making doughnuts, dough is extruded and cut using such a dough cutting apparatus and the dough is then cooked.

26 Claims, 16 Drawing Sheets

U.S. PATENT DOCUMENTS

| | | | |
|---|---|---|---|
| 5,938,078 A * | 8/1999 | Dorsey et al. | 222/105 |
| 6,143,339 A | 11/2000 | Weinstein et al. | |
| 6,387,421 B1 | 5/2002 | Clanton et al. | |
| 6,511,309 B1 | 1/2003 | Hunter | |
| 6,511,689 B2 | 1/2003 | Lowry et al. | |
| 6,586,031 B1 | 7/2003 | Kelly | |
| 6,964,562 B2 * | 11/2005 | Hunter | 425/133.1 |

FOREIGN PATENT DOCUMENTS

| | | |
|---|---|---|
| WO | WO03022058 | 3/2003 |

OTHER PUBLICATIONS

Other Information, Applicant submission dated Nov. 1, 2007.

* cited by examiner

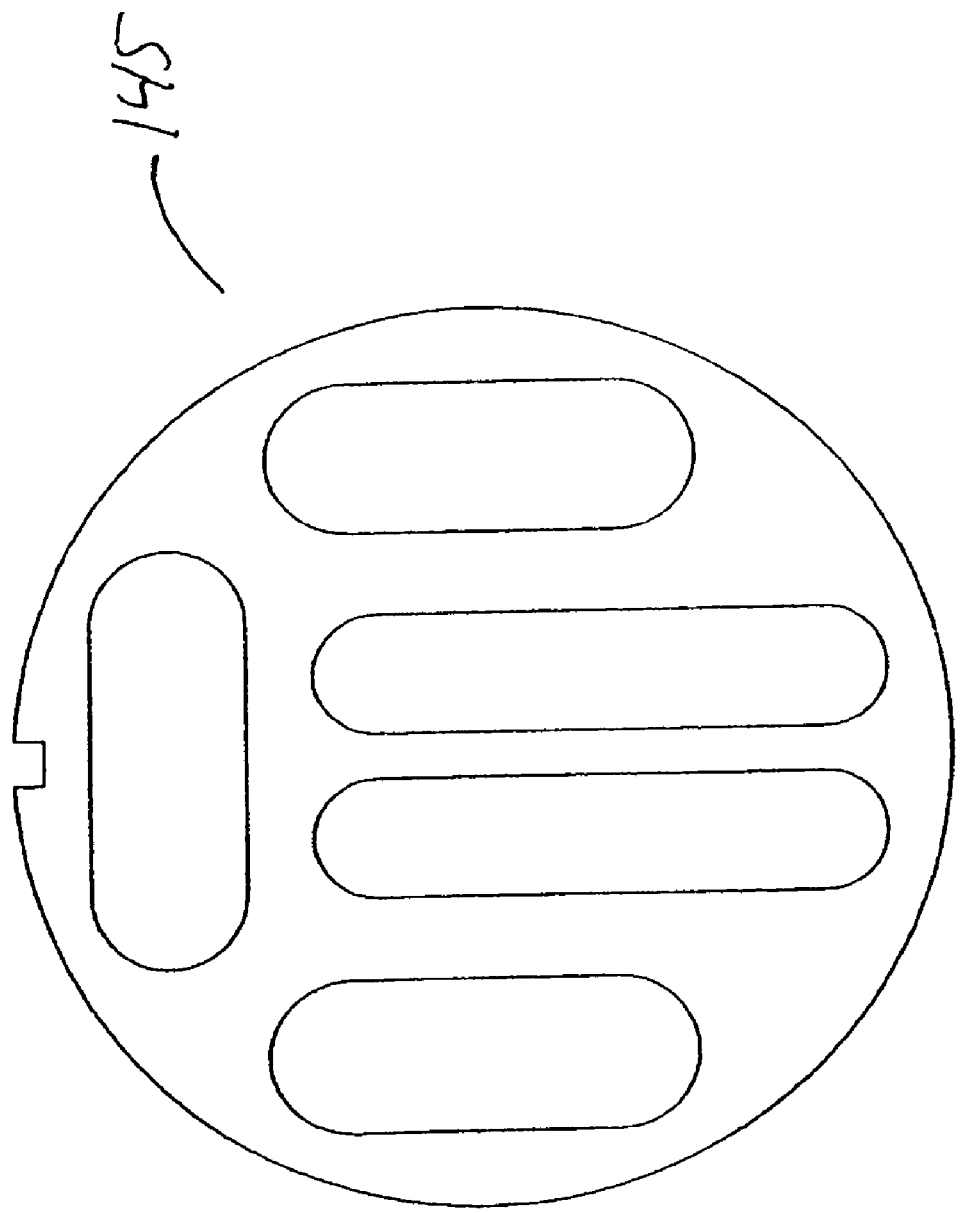

METHODS AND APPARATUSES FOR CUTTING DOUGH UTILIZING A SHAPED OPENING

RELATED APPLICATIONS

This application claims priority to Application Ser. No. 60/609,929, filed on Sep. 15, 2004, titled "Methods and Apparatuses for Cutting Dough," the entirety of which is incorporated herein by reference.

FIELD OF THE INVENTION

The present invention relates generally to methods and apparatuses for cutting dough. More particularly, embodiments of the present invention relate to methods and apparatuses for cutting dough to form dough-based products having a variety of shapes.

BACKGROUND OF THE INVENTION

Doughnut production involves mixing and extruding dough and then frying the dough. In some non-limiting processes, dough is cut and dropped onto a belt or tray and transported through a proofer to a frying apparatus for cooking. After cooking, the dough-based product may be glazed, filled, and/or decorated to make the final doughnut. Other processes for making doughnuts are also known.

An apparatus for extruding dough is often referred to as an extruder. Typical extruders comprise a container for the dough, a lid with hold-down screws, and an extruding mechanism that dispenses the dough-based products at the base of the container. The dough is extruded and cut by an extruding mechanism.

A typical extruder is constructed somewhat like a pressure cooker, and the container is airtight when the screws are tightened and the lid is secured. Once secured, the container is pressurized to a pre-selected starting air pressure that is based on the type of dough-based product to be dispensed. Air pressure can be important to the maintenance of proper dispensed weight of the selected dough-based product. Next, the extrusion process is initiated and air pressure forces the dough through the cutters as they are opened and closed by the air cylinder mechanism. Examples of extruders are described in U.S. Pat. Nos. 6,511,689 and 6,511,309. U.S. Pat. No. 6,511,689 is hereby incorporated by reference.

Extruders are important in controlling the size and shape of dough-based products. Among other features and aspects, the extruders described in U.S. Pat. No. 6,511,689, assist in controlling the size of dough-based products. Among other features and aspects, dough cutters assist in controlling the shape of dough-based products.

For many dough-based products, the shapes of the products are uniform. For example, many doughnuts have generally uniform shapes. Doughnuts, such as ring doughnuts, doughnut shells, doughnut holes, and others, often have rounded, substantially uniform shapes.

Doughnuts and other dough-based products have traditionally been extruded and cut as substantially uniform shapes for a number of reasons. The extrusion and cutting of dough-based products having generally uniform shapes is believed to be easier than the extrusion and cutting of dough-based products having relatively complex and/or non-uniform shapes. For example, with substantially uniform dough-based products, the flow of dough through and out the dough cutters is generally consistent at all locations. As dough-based products have traditionally been extruded and cut as substantially uniform shapes, the production of dough-based products having relatively complex and/or non-uniform shapes could require the purchase and design of new dough cutters for each new shape, which could be expensive.

A need exists for manufacturers of dough-based products to be able to extrude and cut dough-based products having a variety of shapes. The ability to extrude and cut dough-based products having a variety of shapes could provide unique marketing opportunities to manufacturers and sellers of dough-based products. Consumers could be intrigued by the various product shapes and designs available. For example, manufacturer and sellers of dough-based products might generate consumer interest by selling dough-based products in shapes associated with holidays, events, sports teams, locations, companies, cities, states, etc. A need also exists to be able to extrude and cut dough-based products having a variety of shapes in a manner that is cost-effective to the manufacturers and sellers of dough-based products.

SUMMARY

Embodiments of the present invention include methods and apparatuses for cutting dough. In one embodiment of the present invention, a dough cutting apparatus comprises a barrel having two ends, a removable die comprising a shaped opening, the removable die adapted to be coupled to a first end of the barrel, and a knife adapted to cut dough extruded from the shaped opening. In one method for making doughnuts according to the present invention dough is extruded and cut using such a dough cutting apparatus and the dough is then cooked.

These illustrative embodiments are mentioned not to limit or define the invention, but to provide examples to aid understanding thereof. Illustrative embodiments are discussed in the Detailed Description, and further description of the invention is provided there. Advantages offered by the various embodiments of the present invention may be further understood by examining this specification.

FIGURES

These and other features, aspects, and advantages of the present invention are better understood when the following Detailed Description is read with reference to the accompanying drawings, wherein:

FIG. 17 shows a top elevational view of an embodiment of a breaker bar for use with dough cutters of the present invention.

DETAILED DESCRIPTION

Figure 1:
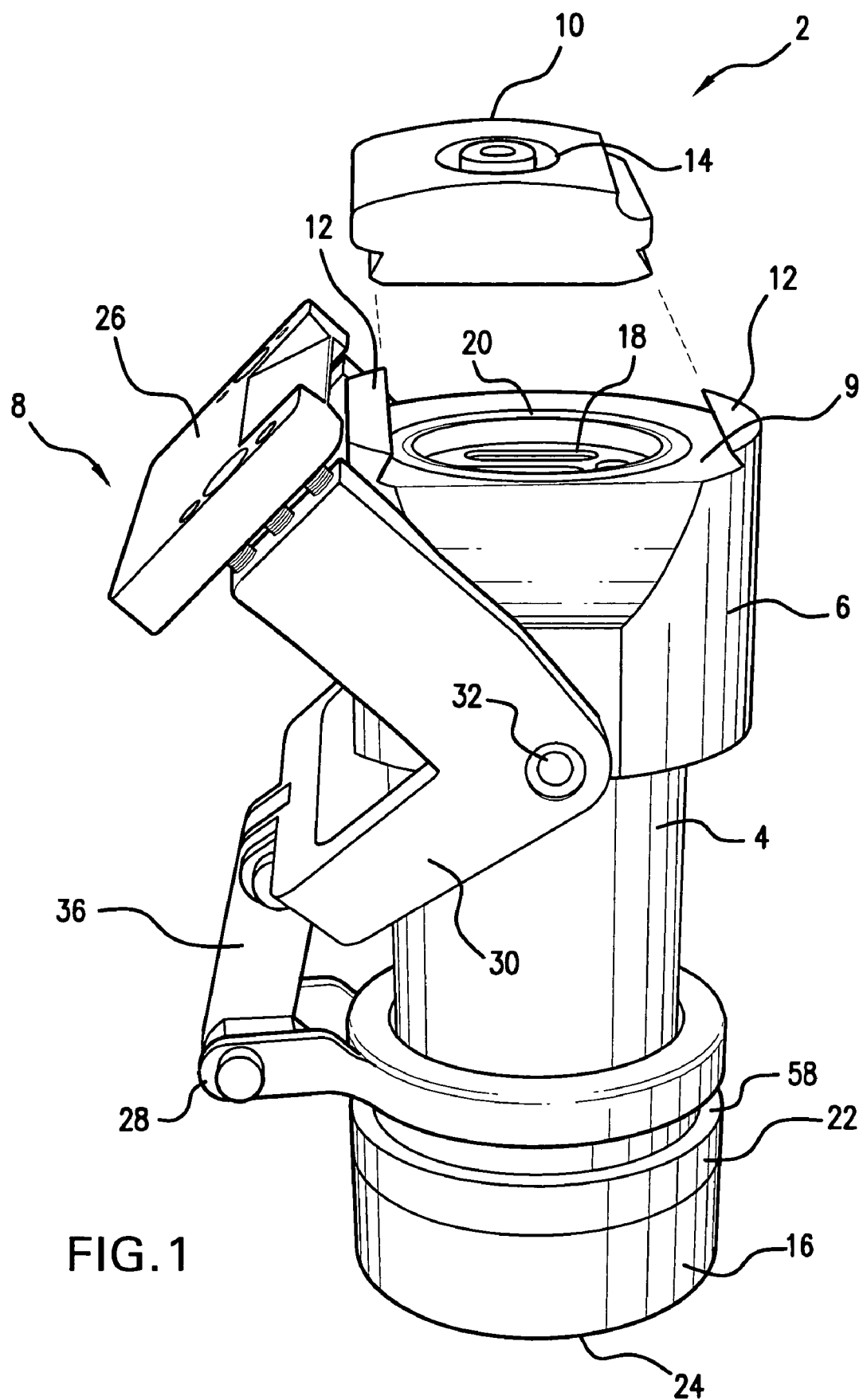
FIG. 1 is a perspective view of an embodiment of a dough cutter of the present invention.

Embodiments of the present invention provide methods and apparatuses for cutting dough. More particularly, embodiments of the present invention relate to methods and apparatuses for cutting dough to form dough-based products having a variety of shapes. In one embodiment, a dough cutting apparatus according to the present invention comprises a barrel having two ends, a removable die comprising a shaped opening, the removable die adapted to be coupled to a first end of the barrel, and a knife adapted to cut dough extruded from the shaped opening.

Introduction

One embodiment of the present invention comprises a dough cutter configured to create "doughnut shells." As used herein, "doughnut shells" refer to doughnuts that do not have hollow center portions, but may have a soft interior that can be filled with jelly, custard, whipped cream, or other fillings. If filled, a filling is injected into a doughnut shell; the filling moves the internal structure of the doughnut toward the outer skin of the doughnut to make room for the filling. Embodiments of dough cutters of the present invention used to extrude and cut shell doughnuts may also be referred to as "shell cutters."

Embodiments of the present invention may be capable of cutting round and non-round doughnut shells. The non-round doughnut shells described herein can be created in a number of shapes including, without limitation, shapes associated with holidays, events, sports teams, locations, companies, cities, states, etc. Doughnut producers and sellers have varying marketing needs based on the time of year, local sports and other events, geographical location, and other factors. By providing the capability of producing variously shaped doughnut shells, embodiments of the present invention provide the flexibility to meet these marketing needs in a cost effective manner.

One embodiment of a shell cutter according to the present invention comprises a barrel with two ends. One end of the barrel is adapted to connect to a tank containing dough to be extruded. For example, the barrel may include a clamp area or threads.

One end of a head can be attached to the other end of the barrel using threads or some other fastening means. The head includes an opening for the dough to pass through the head from the barrel to an opposite end. On the opposite end of the head is at least one mounting point or other means for coupling the removable die and the head.

The removable die is configured to mount to the at least one mounting point on the head. The removable die also has a shaped opening. The opening may be a standard substantially circular opening or may be some other shape. Various removable dies may be attached to the head to create different shapes of shell doughnuts or to allow replacement of a worn die.

The shell cutter may also include a knife. The knife is configured to pass over the shaped opening in the die to cut the dough to create the doughnuts. When the knife is over the shaped opening, i.e., closed, it covers the opening so no dough can pass out of the die. An actuator can be attached to the knife to move it between an open position and a closed position.

The tank containing the dough can be pressurized so that the dough is pushed through the barrel, head, and removable die. If the tank is pressurized, the seals between the tank, barrel, head, removable die, and knife should be configured to avoid leaks. Also, it can be important to maintain a stable pressure in the tank and dough cutter so that the size and shape of the doughnut shell is consistent.

This introduction is given to introduce the reader to the general subject matter of the application. By no means is the invention limited to such subject matter. Illustrative embodiments are described below.

Shell Cutter with Removable Die

FIGS. 1-17 illustrate an embodiment of a dough cutter of the present invention. The dough cutters illustrated in these Figures can be used to form doughnut shells and may also be referred to as shell cutters. Doughnut shells are generally solid and typically do not have a hollow center portion like ring doughnuts. After proofing, cooking, and/or glazing/icing, doughnut shells can have an interior region that can be filled with jelly, custard, whipped cream, or other fillings. The doughnut shells can have a soft interior structure that can be pushed toward the outer skin of the doughnut shell when the filling is injected. In some embodiments, doughnut shells may not be filled with a filling.

FIG. 1 is a perspective view of an embodiment of a dough cutter of the present invention. The dough cutter comprises a barrel 4, a head 6 coupled to the barrel 4, and a cutting assembly 8. These components will be discussed separately below before returning to a discussion of the entire dough cutter 2.

In embodiments of the present invention, the head 6 may be coupled to the barrel 4 in various ways. For instance, in one embodiment, the head 6 is coupled to the barrel 4 using threads. The head 6 can be coupled to the barrel 4 in ways other than the use of threads. Such techniques for coupling are known to those of skill in the art. One consideration in selecting a technique for coupling the barrel to the head is the avoidance of leaks. Because the dough or other product is extruded under pressure in many extruders, it is generally desirable to avoid opportunities for the dough to escape the cutter. Leaks in dough cutters can result in fluctuations in weight and shape of the extruded product.

The head 6 has a first end 9 and a second end 16. The first end 9 comprises an opening 18 and an o-ring 20. The second end 16 is adapted to be coupled to the barrel 4. In the embodiment shown, the second end 16 of the head 6 comprises a threaded portion adapted to receive the threaded portion of a corresponding barrel to facilitate coupling of the head 6 to the barrel 4. As noted above, in embodiments of the present invention, the head can be coupled to the barrel in ways other than the use of threads. One consideration in selecting a technique for coupling the barrel to the head is the avoidance of leaks.

The head 6 also includes a pair of attachment points 12 for a removable die 10. The attachment points 12 are configured so that the removable die 12 can be slid into position over the opening 18 and o-ring 20. The o-ring 20 seals the head 6 and removable die 12 so that leaks are avoided.

The removable die comprises a shaped opening 14. The shaped opening 14 at the first end 9 of the head 6 is shaped in accordance with a desired shape of the dough-based product to be extruded. In the embodiment shown in FIG. 1, the shaped opening 14 is substantially circular. This shape is conventionally used for creating shell doughnuts in cutters without removable dies. In the embodiment shown in FIG. 12, the shaped opening 14 is designed to extrude dough-based products having the shape of the head of a cartoon mouse. Dough-based products extruded using a dough cutter having such a shaped opening 14 might be popular for consumers visiting theme parks, attending movies, or whom are fans of a particular character, cartoon, or comic. In the embodiment shown in FIGS. 10-11, the head 6 includes a shaped opening 17 designed to extrude dough-based products into a heart shape. Such dough-based products might be popular for special occasions, such as Valentine's Day, weddings, anniversaries, etc. The design and selection of shaped openings will be discussed in more detail below.

The second end 16 of the barrel 4 is adapted to be held proximate a tank containing the dough or other material to be extruded. The dough leaving the tank enters the second end 16 of the barrel 4, travels through the barrel 4 and out the head 6. In the embodiment shown in FIGS. 1-3, the second end 16 of the barrel 4 has an outer diameter larger than the diameter of the remainder of the barrel 4. This portion of the barrel 4 can be referred to as a clamp area 22, and the barrel 4 (and the entire dough cutter 2) can be clamped into position using the clamp area 22. For example, the clamp area 22 can slide into a corresponding slot in an extruder and a clamp can be tightened on the clamp area 22 to hold the dough cutter 2 in position.

The second end 16 of the barrel 4 can also have a seal area (not shown). The seal area can be used to seal the dough cutter 2 to the device that delivers the dough to the cutter 2. For example, the dough cutter 2 can be sealed to the bottom of an extruder tank. As another example, an extruder tank can be provided with a number of delivery tubes corresponding to the number of dough cutters that can be used, and the dough cutters can seal to the delivery tubes at their seal areas. A seal between the dough cutter and the device that delivers dough to the cutter can be important as it can prevent dough from leaking and can help maintain the pressure in an extruder tank if used.

Because extruders often use a tank of dough under pressure such that dough would continually pass through the shaped opening unless the shaped opening is blocked, the use of a device for temporarily blocking the flow of dough through the shaped opening and/or cutting the extruded dough may be needed. Embodiments of the present invention can utilize a cutting member to divide the extruded dough into dough-based products of a desired size.

Figure 2:
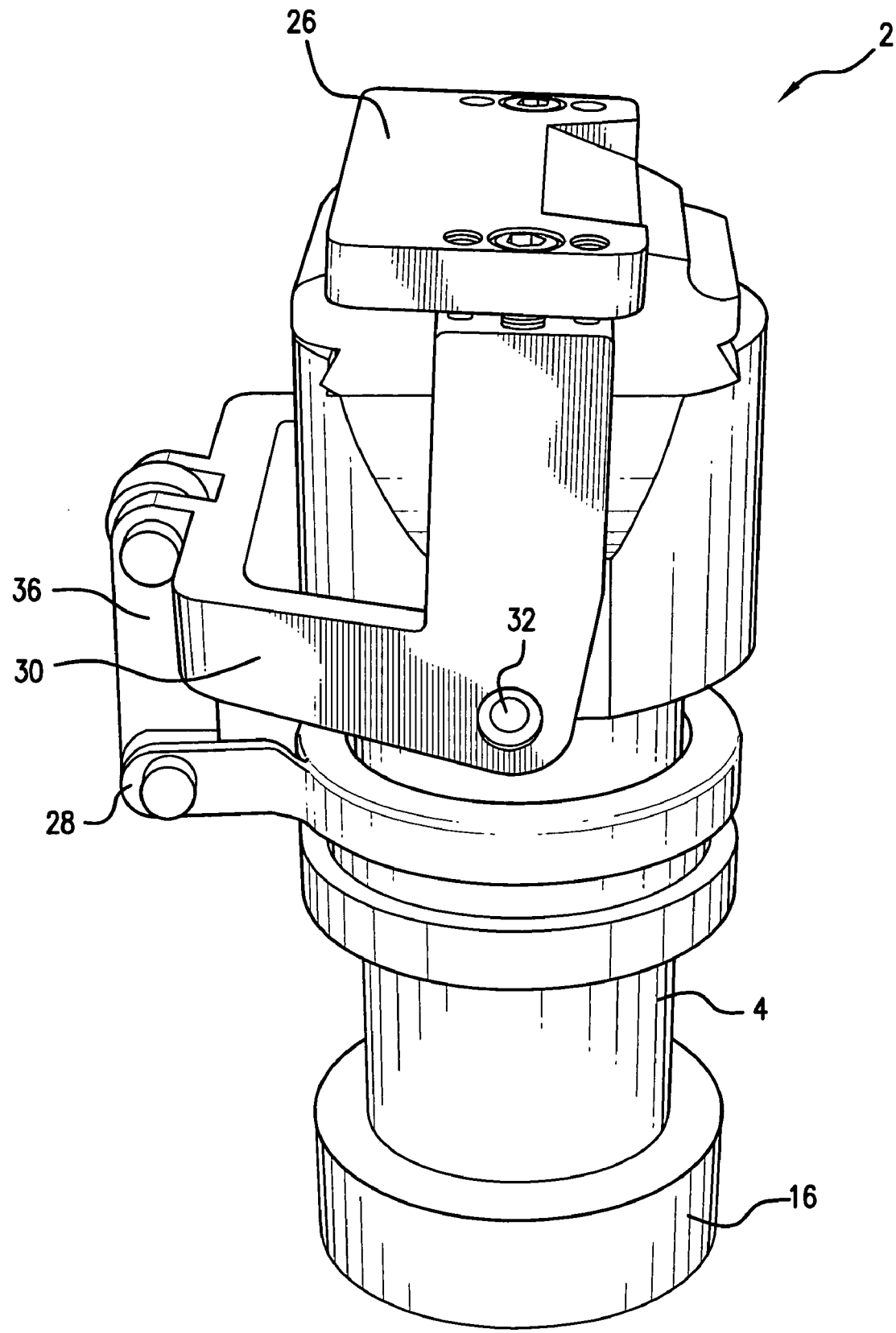
FIG. 2 is a perspective view of the dough cutter of FIG. 1 with the cutter assembly closed over the shaped opening of the removable die.
Figure 3:
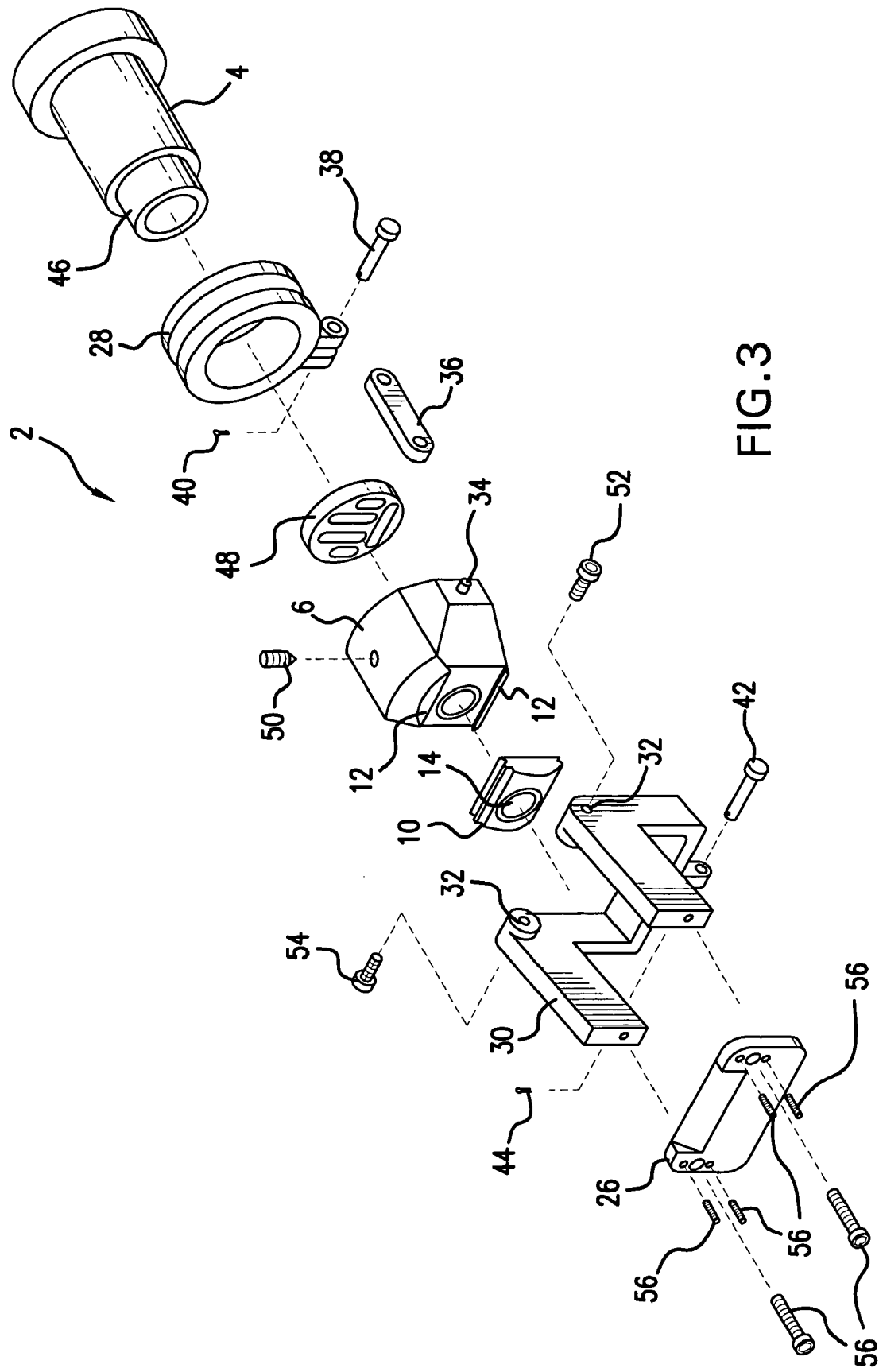
FIG. 3 is an assembly drawing illustrating how the embodiment of a dough cutter shown in FIGS. 1 and 2 can be assembled.

FIGS. 1-3 illustrate one embodiment of a cutting assembly 8. The cutting assembly 8 shown in FIGS. 1-3 is adapted for use with the barrel 4 and head 6. FIGS. 1 and 2 illustrate how the cutting assembly 8 shown can be used. Other cutting assemblies can be designed and adapted for use with other types of barrels and heads.

In the embodiment shown, the cutting assembly 8 comprises a cutting member 26 and an actuator 28 coupled to the cutting member 26. In the embodiment shown, the actuator 28 is coupled to the cutting member by a yoke 30. The cutting member 26 is secured to the yoke 30 in the embodiment shown by screws. In the embodiment shown, the cutting member is a knife. Other types of cutting members may be utilized and knife may be used herein to refer to any type of cutting member. In other embodiments, the cutting member 26 can be permanently attached to the yoke 30 such that the cutting member 26 and yoke 30 are the same device. By securing the cutting member 26 to the yoke 30 using screws, the cutting member 26 can be replaced (e.g., if the cutting member 26 dulls or gets damaged) without having to replace the yoke 30.

The yoke 30, in the embodiment shown, includes two holes 32. A head can be provided with corresponding holes (e.g., holes 34 in FIG. 3) that allow the yoke 30 to be secured to the head by screws or similar fasteners. As will be discussed below, the yoke 30 (and thereby the cutting member 26) can pivot at this location to allow the cutting member 26 to slide over a first end 9 of the head 6 between a first position, which substantially covers the shaped opening, and a second position in which the shaped opening is not covered.

The yoke 30 can be coupled to the actuator 28 in a number of ways. In the embodiment shown, the yoke 30 is coupled to the actuator 28 by a cleavice pin 36. The cleavice pin 36 can be coupled to the actuator 28 and yoke 30 in a number of ways. In the embodiment shown, the actuator 28 and the yoke 30 each include a notch within which the cleavice pin 36 can be positioned. The actuator 28, the yoke 30, and the cleavice pin 36 can be provided with holes, which allow pins to pass through. The pins can be held in place (e.g., in a position that maintains the coupling between the cleavice pin 36 and the actuator 28 and the yoke 30) with a cotter key. Other arrangements, such as nuts and bolts, could also be used. The cleavice pin arrangement shown in FIGS. 1-3 allows the cleavice pin 36 to pivot at the location where it is coupled to the actuator 28 and at the location where it is coupled to the yoke 30. As will be discussed in more detail below, this arrangement facilitates the operation of the cutting assembly 8, whereby the sliding of the actuator 28 on the barrel 4 adjusts the position of the cutting member 26 relative to a shaped opening on a head.

FIG. 2 is a perspective view of the dough cutter of FIG. 1 with the cutter assembly closed over the shaped opening of the removable die. In the embodiment shown, the actuator 28 has moved along the barrel 4 away from the end 16 of the barrel 4. In use, the dough cutter 2 shown would generally upside down relative to the view shown in FIGS. 1 and 2. However, the various aspects of the dough cutter 2 are more clearly visible in the view shown.

The movement of the actuator 28 along the barrel 4 causes the cleavice pin 36 to move. Movement of the cleavice pin 36 causes the yoke 30 to pivot at the hole 32. The pivoting of the yoke 30 causes the cutting member 26 to cut any dough extruded through the shaped opening (not shown) and to cover the shaped opening.

FIG. 3 is an assembly drawing illustrating how the embodiment of a dough cutter shown in FIGS. 1 and 2 can be assembled. To assemble the dough cutter 2, the cleavice pin 36 was coupled to the actuator 28 using the pin 38 and cotter key 40. The other end of the cleavice pin 36 is coupled to the yoke 30 using another pin 42 and cotter key 44. The actuator 28 is slid over the first end 46 of the barrel 4. A breaker bar 48 is utilized in the embodiment of the dough cutter 2 shown, although it is not present in all embodiments.

FIG. 17 shows a top elevational view of an embodiment of a breaker bar for use with dough cutters of the present invention. The breaker bar 48 is inserted and secured in the head 6 using a screw 50 in this embodiment. The breaker bar 48 assists in distributing the dough as it moves through the head 6. The breaker bar 48 can also assist in de-gassing the dough as it moves through the head 6. Carbon dioxide may continue to form in yeast-raised dough as the dough passes through the dough cutter and the breaker bar 48 can assist in breaking gas bubbles that might form in the dough.

After the breaker bar 48 is secured in the head 6, the head 6 is coupled to the first end 46 of the barrel 4 using their threaded portions. Two screws 52, 54 were used to secure the yoke 30 to the head 6 through holes in the yoke 30 and the head 6. The yoke 30 can pivot at this location to allow the cutting member 26 to slide over the first end 9 of the head 6. The yoke 30 pivots as the actuator 28 slides over at least a portion of the barrel 4.

The cutting member 26 is affixed to the yoke 30 with several screws 56. As the yoke 30 pivots, the cutting member 26 moves across and covers the shaped opening 14 in the removable die 10.

The removable die 10 may be inserted during assembly. The removable die 10 may also be inserted after the rest of the dough cutter 2 is assembled and may be replaced in order to cut dough of different shapes or in order to replace a worn out removable die 10. The removable die 10 shown in FIG. 2 is affixed to the head 6 by sliding it under the attachment points 12. Other means of attaching the removable die 10 may be used. For instance, in one embodiment, the removable die 10 and head 6 include threads for attachment. In another embodiment, the removable die 10 attaches directly to the barrel 4. In yet another embodiment, the removable die 10 comprises one or more projections which fit into grooves on the inside surface of the head 6 or barrel 4.

As noted above, embodiments of dough cutters of the present invention can incorporate a wide variety of shaped openings depending on the desired shape of the dough-based product. To facilitate the use of different shaped openings, embodiments of the present invention can use a removable die. The removable die, in some embodiments, can comprise a shaped opening and can be adapted to be coupled to a head of a dough cutter.

The use of a removable die according to embodiments of the present invention can allow a manufacturer of dough-based products to extrude and cut dough-based products having different shapes at a reduced cost. The use of a removable die according to embodiments of the present invention can also allow a manufacturer of dough-based products to more conveniently change the shape of dough-based products being extruded and cut. For example, in embodiments where a removable die is not used, a dough manufacturer would need to change dough cutters (e.g., use a different barrel, head, cutting mechanism, etc.) or disassemble a dough cutter to replace a head with a head having a different shaped opening. The use of an entirely different dough cutter could increase the manufacturer's capital costs since the manufacturer would need a different dough cutter for each shape of dough-based product to be extruded and cut. To change heads of a dough cutter, rather than using a different dough cutter, could increase a manufacturer's labor costs since some time and effort could be required to disassemble a dough cutter to remove a head, to add a new head, and to re-assemble the dough cutter. The use of removable dies in accordance with embodiments of the present invention can advantageously allow a manufacturer to produce differently shaped dough-based products while avoiding significantly increased manufacturing costs.

The use of removable dies in accordance with embodiments of the present invention can also be useful in the production of conventional, round dough-based products. For example, removable dies may be useful to manufacturers who do not wish to produce differently shaped dough-based products. Extended production of dough-based products having the same shape can result in damage to the opening in the head of a dough cutter. For example, the action of a cutting member in sliding across the head can damage the opening over time. Rather than replacing the entire head, the use of removable dies can allow the manufacturer to replace the removable die only. The use of dough cutters having removable dies also allows dough manufacturers who initially decide to produce dough-based products having the same conventional shape to have the option to later start producing shaped dough-based products.

FIG. 1 shows the dough cutter 2 in an "open" position. In the open position, the cutting member 26 is not covering the shaped opening 14. When the dough cutter 2 is installed on an extruder and the cutting member 26 is in this position, dough can flow through the shaped opening 14. In the embodiment shown, the actuator 28 is positioned adjacent the clamp area 22 when the dough cutter 2 is in the open position. When installed, as discussed below, a clamp from an extruder may be positioned between the actuator 28 and the clamp area 22 to secure and seal the dough cutter to the extruder.

In FIG. 2, the cutting member 26 is covering the shaped opening 14. As shown in FIG. 2, the actuator 28 has moved to a position between the clamp area 22 and the head 6. The movement of the actuator 28 pushes the cleavice pin 36 upward, which correspondingly cause the yoke 30 to pivot about screws 52, 54 resulting in the cutting member 26 beginning to slide over the shaped opening 14.

When dough is being extruded through the shaped opening 14, the movement of the cutting member 26 over the shaped opening 14 cuts the extruded dough. In operation, the movement of the actuator 28, the yoke 30, and the cutting member 26 can be fairly rapid and the dough cutter 2 may not pause between the positions shown in FIGS. 1 and 2, in some embodiments.

FIG. 2 shows the dough cutter 2 in a "closed position". In the closed position, the cutting member 26 is covering the shaped opening 14. When the dough cutter 2 is installed on an extruder and the cutting member 26 is in this position, dough is not able to flow through the shaped opening 14. In the embodiment shown, the actuator 28 is positioned proximate the head 6 when the dough cutter 2 is in the closed position. When the actuator 28 begins sliding toward the clamp area 22 of the barrel 4, the cutting member 20 will also move to again expose the shaped opening 14 such that dough can be extruded through the shaped opening 14.

The movement of the actuator 28 between a position proximate the clamp area 22 of the barrel 4 (or a position proximate a clamp from an extruder that seals the dough cutter to the extruder at the clamp area 22) and a position proximate the head 6 adjusts the position of the cutting member 26 relative to the shaped opening 14 from a position where the cutting member 26 does not cover the shaped opening 14 to a position where the cutting member 26 covers the shaped opening 14. When this embodiment of a dough cutter 2 is used with an extruder, this movement results in the extruding and cutting of dough. Dough is extruded through the shaped opening 14 when the cutting member 26 is open, and the dough being extruded is cut when the cutting member 26 closes. The amount of time that the dough cutter remains open can affect the size of the dough-based product (e.g., the longer the dough cutter remains open, the larger the dough-based product).

In the Figures, the dough cutter 2 is shown with the shaped opening 14 pointing upward. The dough cutter 2 is oriented in this manner to better show its different features. In use, the dough cutter 2 would typically be positioned with the shaped opening 14 pointing generally downward in order to utilize gravity in extruding the dough. When the dough cutter is oriented with the shaped opening 14 pointing generally downward, the extruded and cut dough can drop from the dough cutter 2 onto a tray, a conveyor, or other surface.

To orient the dough cutter 2 with the shaped opening 14 pointing generally downward, the dough cutter 2 can be positioned at the bottom of an extruder tank. U.S. Pat. No. 6,511, 689 illustrates in FIG. 2 how dough cutters (referred to as extruding mechanisms 25 in the '689 patent) can be positioned relative to an extruder tank (referred to as tank 12 in the '689 patent). The dough leaving an extruder tank enters the second end 16 of the barrel 4, travels through the barrel 4 and out the shaped opening 14. The dough cutter 2 can be clamped into positioned at the bottom of the tank using the clamp area 22. A clamp or similar device can hold the barrel 4 between the clamp area 22 and the actuator 28. For example, the clamp or similar device can form an annulus having a diameter that is larger than the diameter of the longest portion of the barrel 4, but smaller than the diameter of the clamp area 22, such that the clamp area 22 cannot slide through the annulus. The clamp can be positioned between the actuator 28 and the clamp area 22, such that the actuator 28 does not rest against the clamp area 22.

The dough cutter 2 can be sealed to the extruder tank at a seal area at the end 24 of the barrel 4. While the term sealed is used, it should be understood that the seal area is positioned proximate to the bottom of the extruder tank in a manner that reduces the likelihood of dough or air escaping through a gap between seal area and the extruder tank. If a pressurized tank is used to push the dough through the shaped opening 14, it can be important to maintain the pressure of the tank so that the desired weight of dough is extruded and cut. Thus, the connection between the dough cutter 2 and the extruder tank can be important in the avoidance of leaks.

When installed on an extruder, the extruder can include a bung or similar protrusion that extends vertically downward from the extruder tank into the second end 16 of the barrel 4. Dough can flow from a tank on the extruder through the bung and into the dough cutter. A clamp on the extruder can secure the barrel 4 (and the entire dough cutter when assembled) to the extruder when it is tightened on the clamp area 22. The clamp seals the dough cutter to the extruder. An extruder can include a plurality of bungs or protrusions such that multiple dough cutters (e.g., one dough cutter for each bung or protrusion) can be installed.

An actuator grip from the extruder can be coupled to the actuator 28 on the dough cutter. For example, the actuator grip can be a u-shaped or horseshoe-shaped device that can slide into a groove 58 of the actuator 28, such that vertical movement of the actuator grip can move the actuator 28 upwardly or downwardly. The actuator grip, in some embodiments, can be coupled to a bar or shaft on the extruder that rotates to move the actuator grip. For example, the shaft can be oriented horizontally (e.g., the length of the shaft is horizontal), and the shaft can rotate on its horizontal axis. The actuator grip can be approximately perpendicular to the horizontal shaft such that rotation of the shaft in one direction moves the actuator grip (and hence the actuator 28) upward and rotation of the shaft in the opposite direction can move the actuator grip (and hence the actuator 28) downward. When multiple dough cutters are installed on the same extruder, an actuator grip associated with each dough cutter can also be coupled to the horizontal shaft. The horizontal shaft can move each of the actuators in unison so that the dough-based products from each dough cutter are extruded and cut at approximately the same time.

In some embodiments, when installed, the dough cutter 2 can start in the closed position (e.g., with the cutting member blocking the shaped opening). To extrude a dough-based product, the horizontal shaft rotates in one direction, which in turn moves the actuator grip and the actuator 28 upward. The actuator 28 moves toward the clamp area 22 of the barrel 4, which results in the cutting member 26 sliding off of the shaped opening 14 to allow dough to be extruded through the shaped opening 14. To cut the extruded dough, the horizontal shaft rotates in the opposite direction, which in turn moves the actuator grip and the actuator downward. The actuator 28 moves away from the clamp area 22 of the barrel 4, which results in the cutting member 26 sliding over the shaped opening 14 to cut the extruded dough. In some embodiments, the dough cutter remains in the closed position when the extruder is not in operation.

Figure 4A:
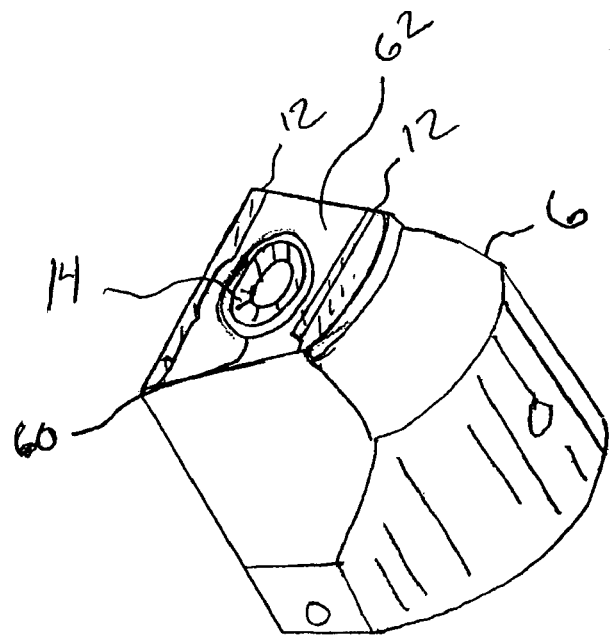
FIG. 4A is a perspective drawing of a head in one embodiment of the present invention.

FIG. 4A is a perspective drawing of a head in one embodiment of the present invention. Although FIGS. 1-4 show embodiments of the present invention incorporating a head, some embodiments of the present invention may not include a head. For instance, some embodiments may include a removable die attached directly to a barrel. In such an embodiment, no head would be utilized. In other embodiments, the barrel and head are incorporated into a single structure and may not be referred to separately as a barrel and a head. The head 6 shown in FIG. 4A includes two attachment points 12. The head also includes an opening 14 through which dough passes into the removable die.

In the embodiment shown, the head also comprises an o-ring 60. While an embodiment utilizing an o-ring is shown, other shapes can be used. Also, in some embodiments no o-ring is used. In an embodiment comprising an o-ring, the o-ring may provide some resistance, which can provide a cue to an operator regarding alignment of the removable die in relation to the head 6. The o-ring 60 may also assist in maintaining the position of the removable die. The o-ring 60 can be constructed from food-grade materials known to those of skill in the art. An example of a commercially available o-ring useful in embodiments of the present invention is part number H70FDA223 from Applied Industrial Technologies of Cleveland, Ohio.

Figure 4B:
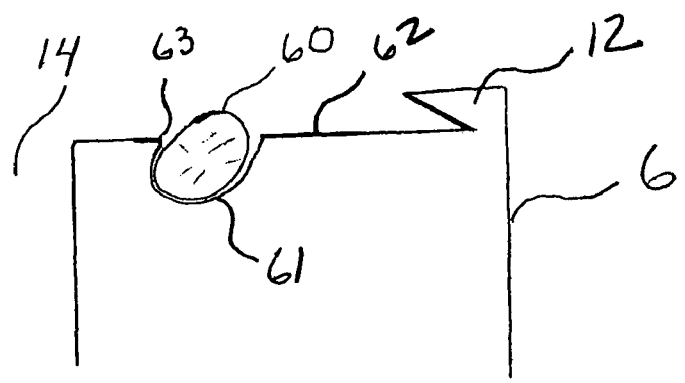
FIG. 4B is a cross-sectional perspective drawing of a head in one embodiment of the present invention.

FIG. 4B is a cross-sectional view drawing of a head in one embodiment of the present invention. The o-ring 60 can be positioned in a groove 61 in a first end 62 of the head 6. In the embodiment shown, the o-ring 60 and groove 61 can be selected or designed such that a portion of the o-ring 60 extends above the side walls of the groove 61 when the o-ring 60 is positioned in the groove 61. For example, the o-ring 60 may be larger than the depth of the groove 61. By having a portion of the o-ring 60 extend above the side walls of the groove 61, the o-ring 60 can assist in securing the removable die 10 to the head 6.

In the embodiment shown in FIG. 4B, the groove 61 is angled away from the shaped opening 14 to help ensure that the o-ring 60 stays in the groove 61. The groove also has a beveled edge 63 to help avoid compromising or damaging the o-ring 61.

The bottom of the removable die 10 may also comprise a groove that can have approximately the same circumference as the o-ring 60. When the removable die 10 is coupled to the head 6, the bottom of the removable die 10 slides over the first end 62 of the head 6. In doing so, the bottom of the removable die 10 will also slide over the o-ring 60 positioned in the grove of the head 6. The removable die 10 experiences some resistance as it slides over the head 6 due to the o-ring 60 extending out of the groove (the o-ring 60 may compress to some extent as the removable die 10 slides over it). When the groove in the bottom of the removable die 10 is positioned over the o-ring 60, the o-ring 60 can expand into the groove 460 in the removable die 10 since the groove has approximately the same circumference as the o-ring 60 in this embodiment. The o-ring 60, in this embodiment, helps to secure the removable die 10 to the head 6 as it can be positioned in both the groove in the head 6 and the groove in the removable die 10. This alignment makes it difficult for the removable die 10 to slide since the o-ring 60 must be compressed from its extended position in the groove of the removable die 10. This embodiment of the present invention advantageously provides a way of securing a head to a removable die that prevents slipping of the removable die without requiring the use of a fastener, such as a screw. Further, this embodiment also provides a convenient way for removable dies to be changed or replaced.

Other techniques for securing the removable die in position relative to the head can be developed depending on the manner in which the removable die and head are coupled.

Figure 5:
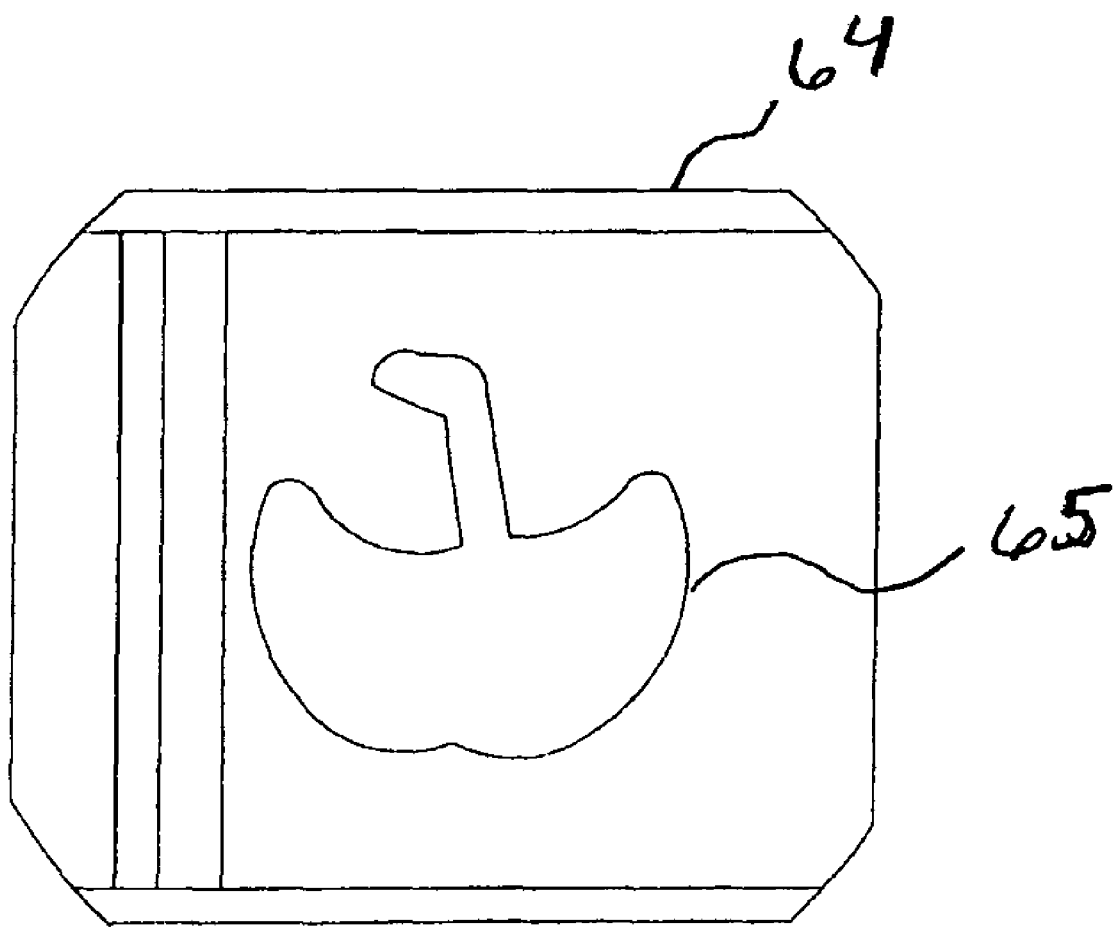
FIG. 5 is a perspective view from the top of a removable die in one embodiment of the present invention.

FIG. 5 is a perspective view from the top of a removable die in one embodiment of the present invention. In the embodiment shown, the removable die 64 comprises a shaped opening 65. The shaped opening 65 is designed so that dough extruded through the opening 65 is produced in the shape of a pumpkin.

Figure 6:
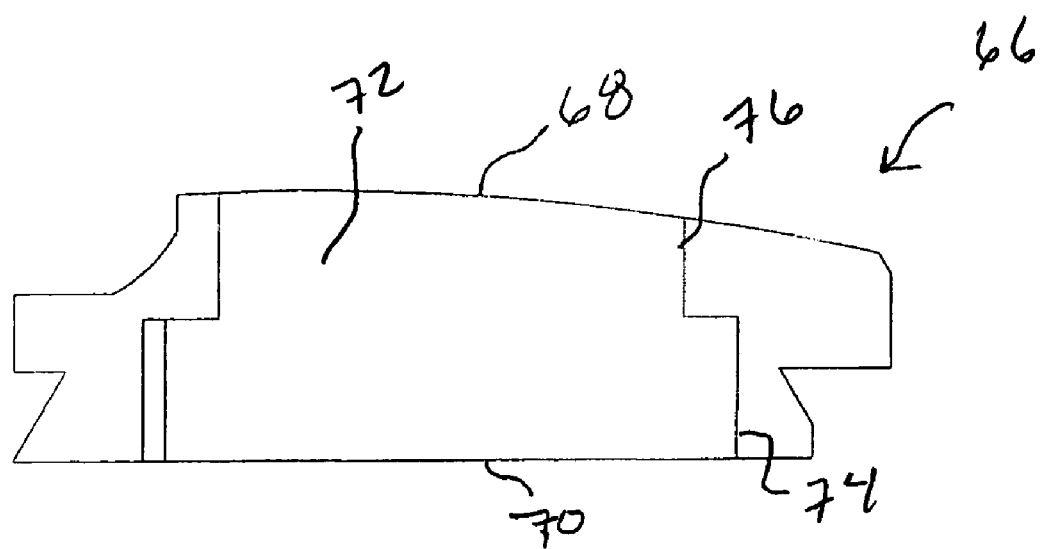
FIG. 6 is a perspective view of the removable die from the side in one embodiment of the present invention.

FIG. 6 is a perspective view of the removable die from the side in one embodiment of the present invention. The removable die 66 shown in FIG. 6 comprises a top 68 and a bottom 70. Extending from the top 68 to the bottom 70 is a shaped opening 72. The shaped opening 72 has a lower portion 74 and an upper portion 76. These details are shown in and described in relation to FIGS. 7 and 8 below.

Figure 7:
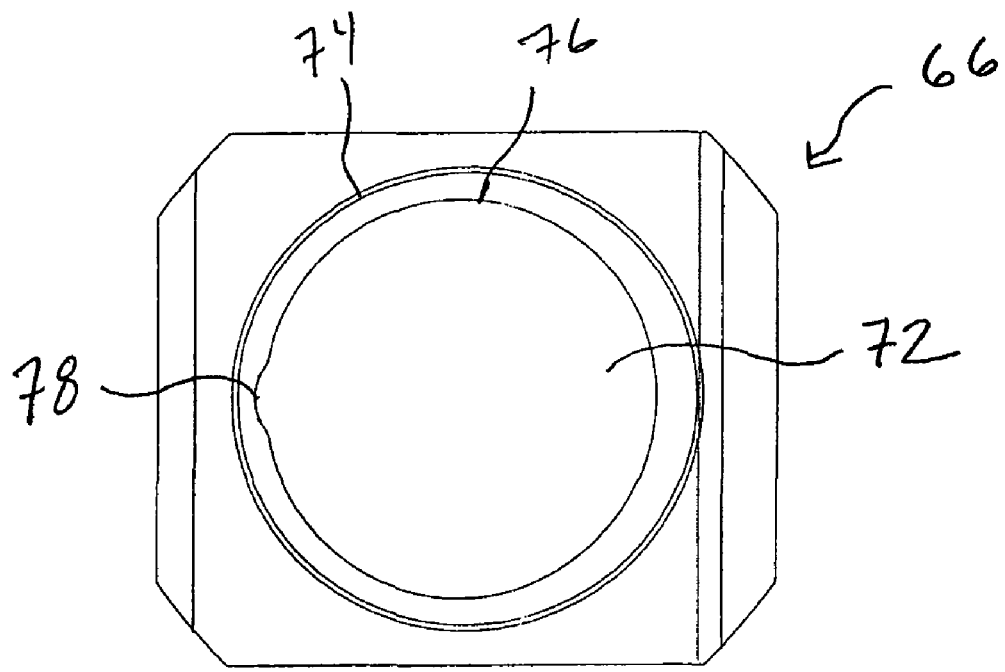
FIG. 7 is a perspective view of the removable die from the side in one embodiment of the present invention.

FIG. 7 is a perspective view of the removable die from the side in one embodiment of the present invention. The removable die 66 shown in FIG. 7 includes a shaped opening 72. The shaped opening 72 has a lower portion 74 and an upper portion 76. As is shown, the lower portion 74 has a larger circumference than the upper portion 76. The shaped opening 72 allows for a die insert (described in relation to FIG. 8) to be inserted into the removable die 66 to form various shapes. In the embodiment shown, the upper portion comprises a notch 78. The notch 78 prevents the die insert from moving in relation to the removable die 66. The notch also establishes a fixed alignment between the removable die 66 and die insert in relation the movement of the cutting member 26 across the head 6.

The removable die described herein may be made from various materials. For instance, in one embodiment, the removable die comprises steel. In another embodiment, the removable die comprises thermoplastic. For example, the removable die may comprise an acetal resin, such as an acetal copolymer. One acetal copolymer that may be used in an embodiment of the present invention is DuPont's Delrin® (www.Dupont.com). In another embodiment, the removable die comprises crystalline thermoplastic polyester. One crystalline thermoplastic polyester that may be used in an embodiment of the present invention is DuPont's Hytrel® (www.Dupont.com).

Die Insert for Removable Die

In some embodiments of the present invention, a die insert may be utilized. A die insert is a piece that is inserted into the removable die to change the shape of the doughnut created by the shaped opening. For instance, in one embodiment, a die insert is used to create the characteristic divisions in dough that are present in a cinnamon bun. A die insert may be used to create other features in a shell doughnut, such as a hole, i.e., a portion of the shell in which no dough is present. Such a die insert may be used, for example, to create a ribbon-shaped doughnut.

Figure 8A:
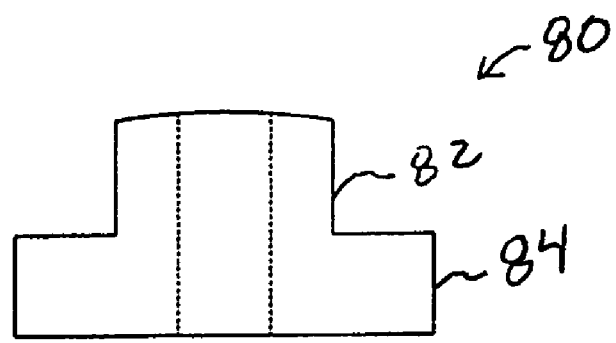
FIGS. 8A and 8B are a top perspective and side perspective, respectively, of a die insert in one embodiment of the present invention.
Figure 8B:
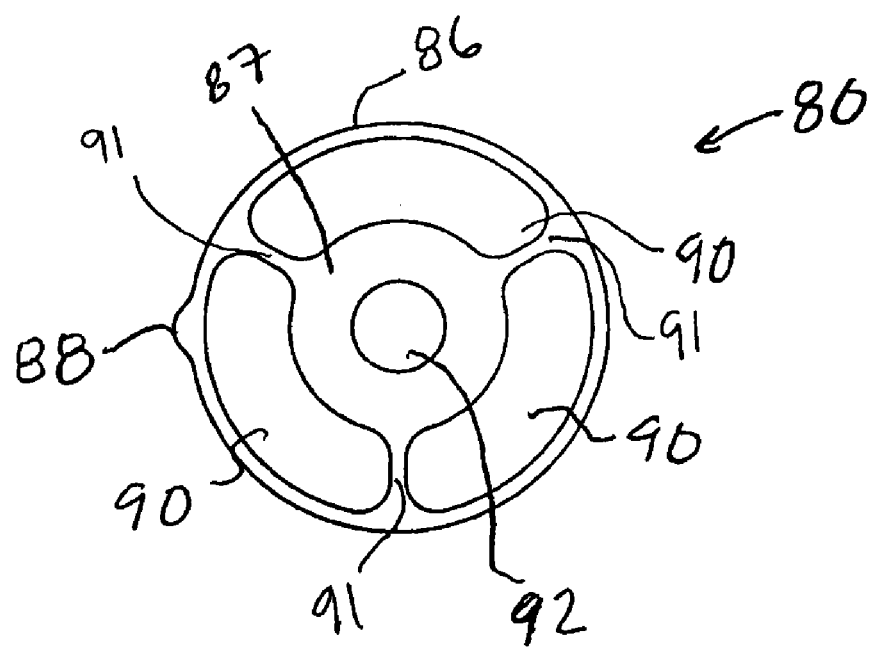

FIGS. 8A and 8B are a top perspective and side perspective, respectively, of a die insert in one embodiment of the present invention. Referring to FIG. 8A, the die insert 80 shown in FIGS. 8A and 8B comprises a narrow top portion 82 and a broader bottom portion 84. The size of the top 82 and bottom 84 are dependent on the size of the removable die in which the die insert 80 will be inserted, e.g., the removable die shown in FIG. 7.

Referring to FIG. 8B, the die insert comprises an outer ring 86 and an inner ring 87. The outer ring 86 comprises a protrusion 88. The protrusion 88 is complementary to the notch 78 shown in FIG. 7. As described above, the protrusion 88 and notch 78 combine to keep the die insert 80 from moving within the removable die and for alignment purposes.

The die insert 80 shown in FIGS. 8A and 8B is adapted for creating a cinnamon bun. As such, it comprises three slots 90 defined by the outer ring 86, inner ring 87 and projections 91 between the outer ring 87 and inner ring 86. It also comprises a hole 92 defined by the inner ring 87. When the dough passes through the insert 80, the characteristic dough demarcations of a cinnamon bun are created in the extruded dough. The die insert 80 may comprise various materials, such as steel or thermoplastic.

In the embodiment of the dough cutter shown in FIGS. 1-3, the shaped opening 14 is designed to extrude the dough into a round shell product. FIGS. 9-15 show various embodiments of a shaped opening that are not round.

Illustrative Shaped Openings

Figure 9:
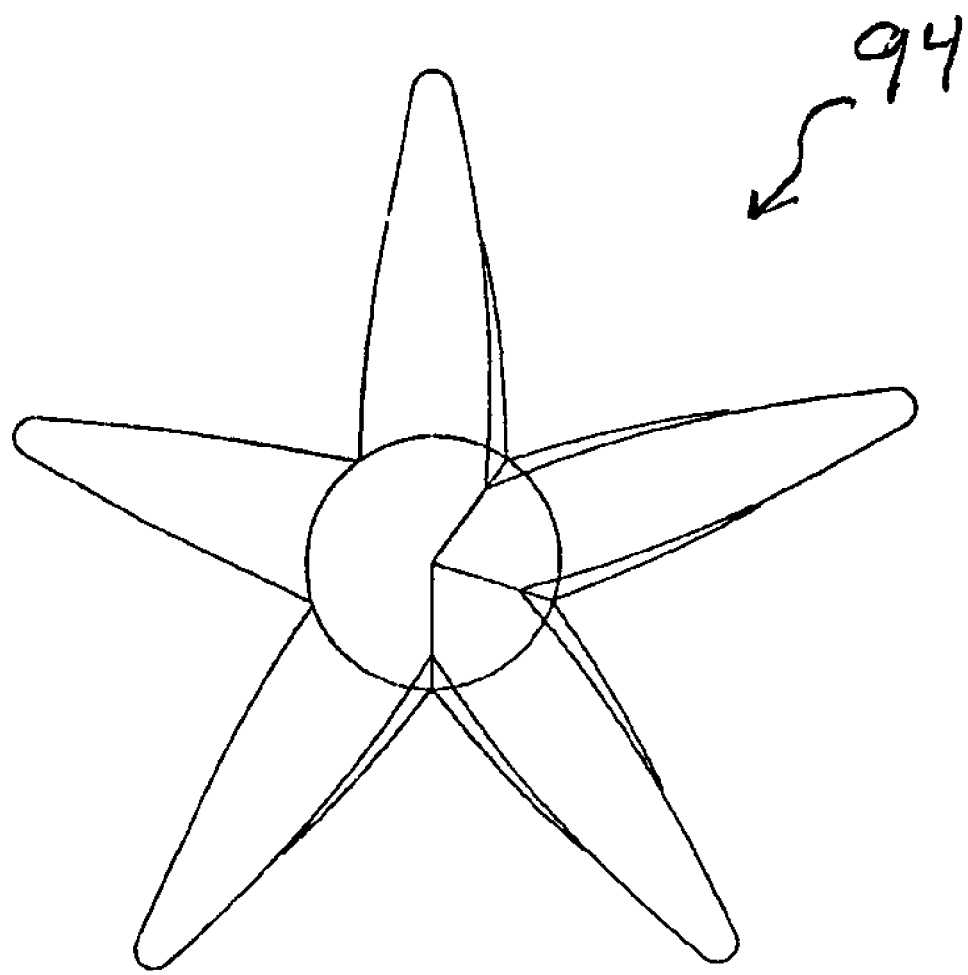
FIG. 9 is an illustration of a star-shaped opening in one embodiment of the present invention.

FIG. 9 is an illustration of a star-shaped opening 94 in one embodiment of the present invention. The star-shaped opening 94 is formed in the removable die shown in FIGS. 1-3 and 5-8. The size of the star-shaped opening 94 is such that the cutting member covers substantially the entire opening 94 when in a closed position. Various other shapes may also be utilized. Some of these shapes are described below.

Figure 10:
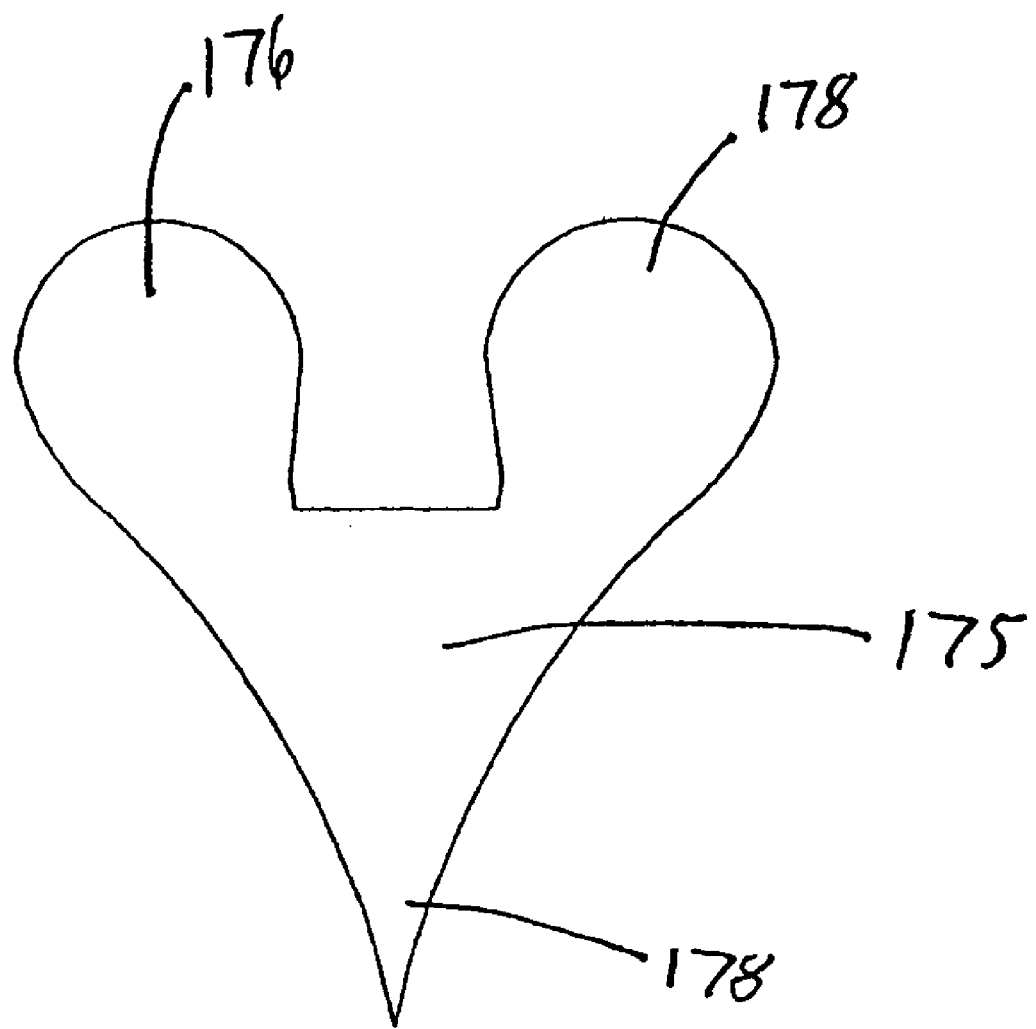
FIGS. 10 and 11 illustrate examples of shaped openings that can be used to produce heart-shaped dough-based products in one embodiment of the present invention.
Figure 11:
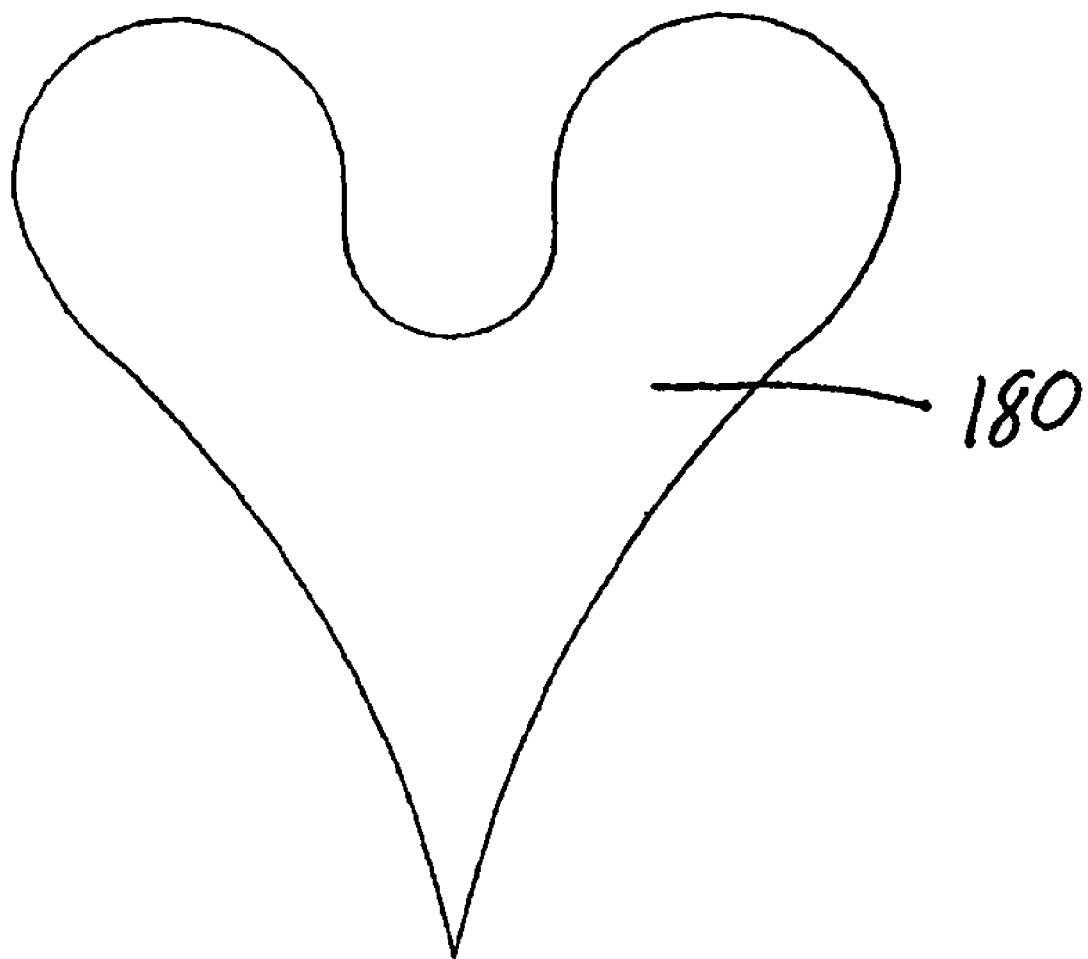

FIGS. 10 and 11 illustrate examples of shaped openings 175, 180 that can be used to produce heart-shaped dough-based products in one embodiment of the present invention. Heart-shaped dough-based products might be popular for special occasions, such as Valentine's Day, weddings, anniversaries, etc.

A number of factors can be important in designing shaped openings for embodiments of dough cutters of the present invention. For example, in the embodiment of a dough cutter shown in FIGS. 1-3, the cutting member 26 slides over the shaped opening 14 to cut the extruded dough. The sliding action of the cutting member 26 can distort the shape of the extruded dough since the force of the cutting member 26 is applied from one side of the extruded dough. This contact by the cutting member 26 with this portion of the extruded dough can result in the shape of the extruded dough being distorted. For example, if the cutting member were to first contact the pointed portion of a heart-shaped extruded dough product, the contact by the cutting member could result in the flattening of the point such that the heart could have a flat or rounded bottom portion rather than a fairly pointed bottom portion.

To account for the potential for a cutting member to distort the shape of the extruded dough, a shaped opening can be designed to estimate the potential for distortion. For example, the shaped opening 64 in FIGS. 15-29 is designed to extrude the dough in a manner that accounts for distortion caused by the movement of the cutting member. In FIGS. 15-29, the cutting member 26 slides across the lobes of the heart-shaped opening 14 before it reaches the point of the opening 70.

FIG. 10 shows a heart-shaped opening designed to account for distortion due to the movement from a cutting member across the extruded dough in one embodiment of the present invention. The heart-shaped opening 175 includes two lobes 176, 177 and a pointed portion 178. The opening in the embodiment shown is designed for dough cutters in which the cutting member would slide across the lobes 176, 177 and then across the pointed portion 178. The lobes 176, 177 are extended and separated from one another at a distance greater than the distance between lobes when hearts are drawn. When dough is extruded, the extruded dough can also have lobes that are extended and spaced one from another. However, the force of a cutting member in sliding across the shaped opening 175 to cut the extruded dough will push the lobes on the extruded dough closer to one another, such that the extruded and cut dough will more closely resemble a heart. Similarly, the pointed portion 178 is also extended. The pointed portion 178 is also extended to account for the force of the cutting member. As the extruded dough is cut, the movement of the cutting member will push the dough toward the pointed portion of the extruded dough. Thus, after cutting the pointed portion of the extruded and cut dough may not be as narrow as shown in the shaped opening 175.

Another consideration in designing the shaped opening is the distance that the extruded and cut dough travels before it lands on a surface, such as a conveyor or tray. If the extruded and cut dough falls a fairly large distance before landing on a tray, for example, the dough may flatten due to the impact with the tray. To account for any impact with a surface after the dough is cut, the shaped opening may be designed to extrude a thicker dough-based product with a smaller cross-sectional area than is ultimately desired. The cross-sectional area of the extruded and cut dough will expand upon impact with the tray.

Figure 12:
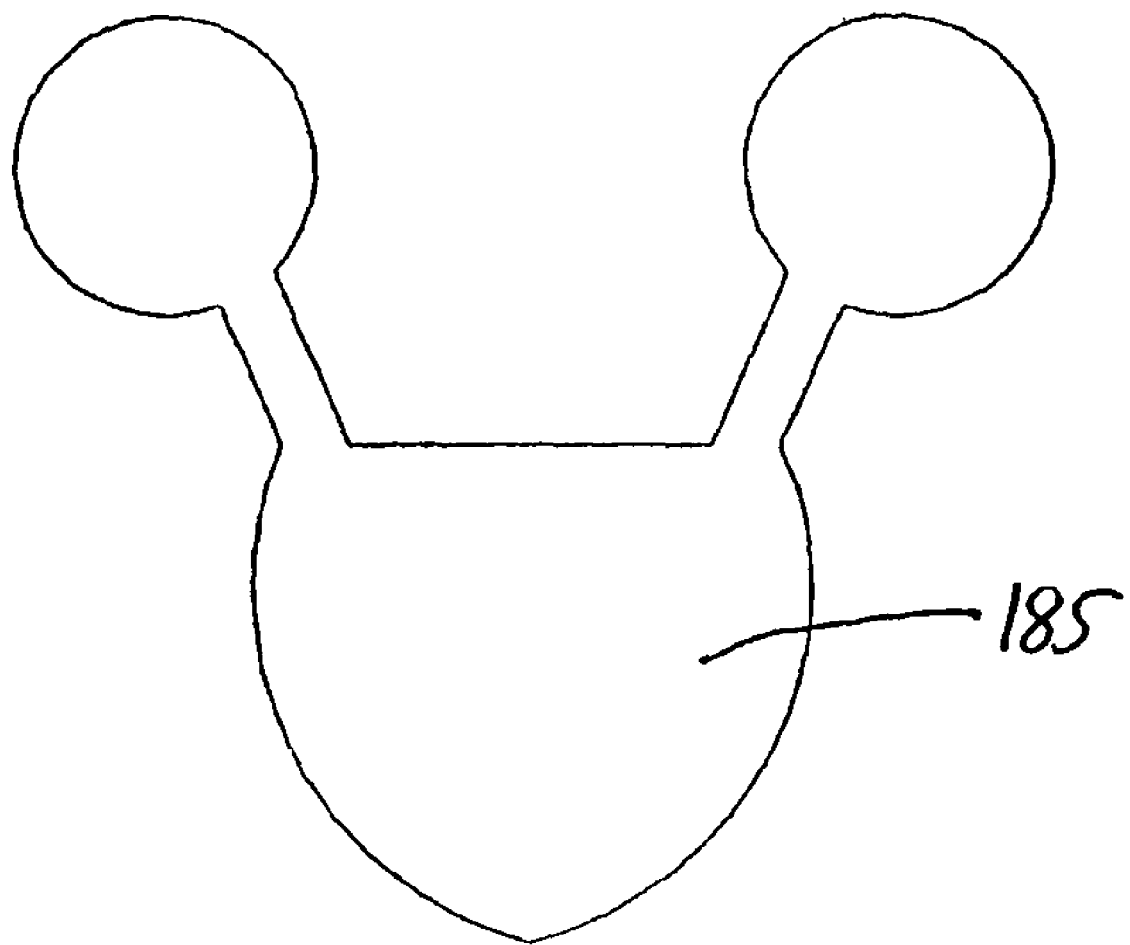
FIG. 12 illustrates a shaped opening that can be used to extrude dough-based products having the shape of the head of a cartoon mouse in one embodiment of the present invention.

FIG. 12 illustrates a shaped opening 185 that can be used to extrude dough-based products having the shape of the head of a cartoon mouse in one embodiment of the present invention. Dough-based products extruded using a dough cutter having such a shaped opening might be popular for consumers visiting theme parks, attending movies, or whom are fans of a particular character, cartoon, or comic.

Figure 13:
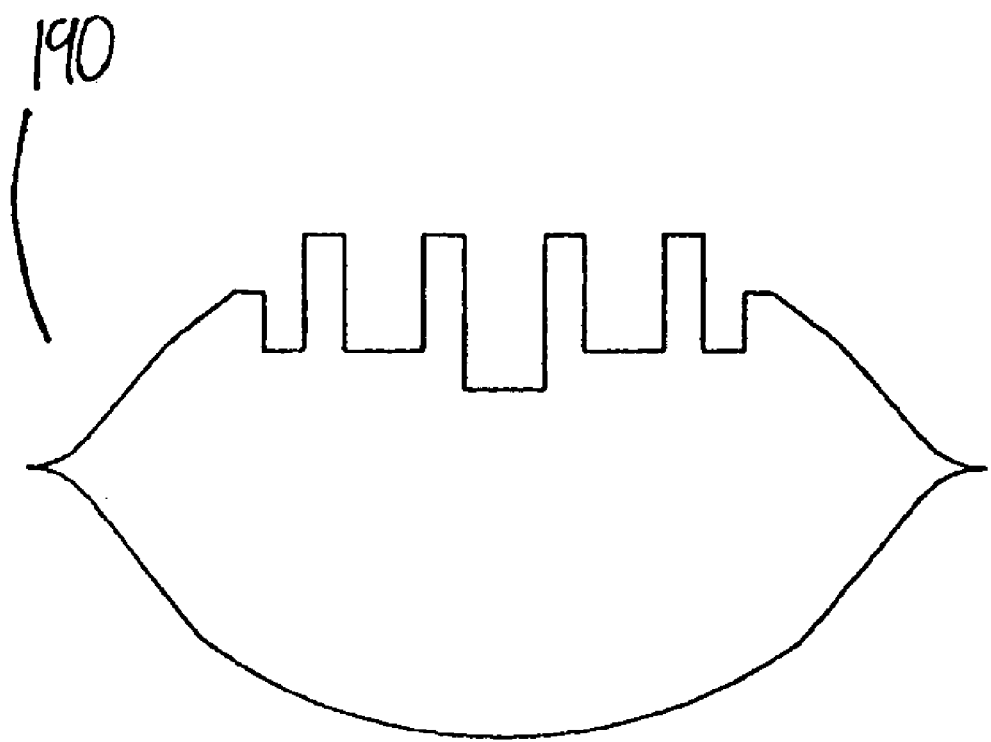
FIG. 13 illustrates a shaped opening that can be used to extrude dough dough-based products shaped like footballs in one embodiment of the present invention.

FIG. 13 illustrates a shaped opening 190 that can be used to extrude dough dough-based products shaped like footballs in one embodiment of the present invention. Dough-based products extruded using a dough cutter having such a shaped opening might be popular at football games, during football season, during football playoffs, etc.

Figure 14:
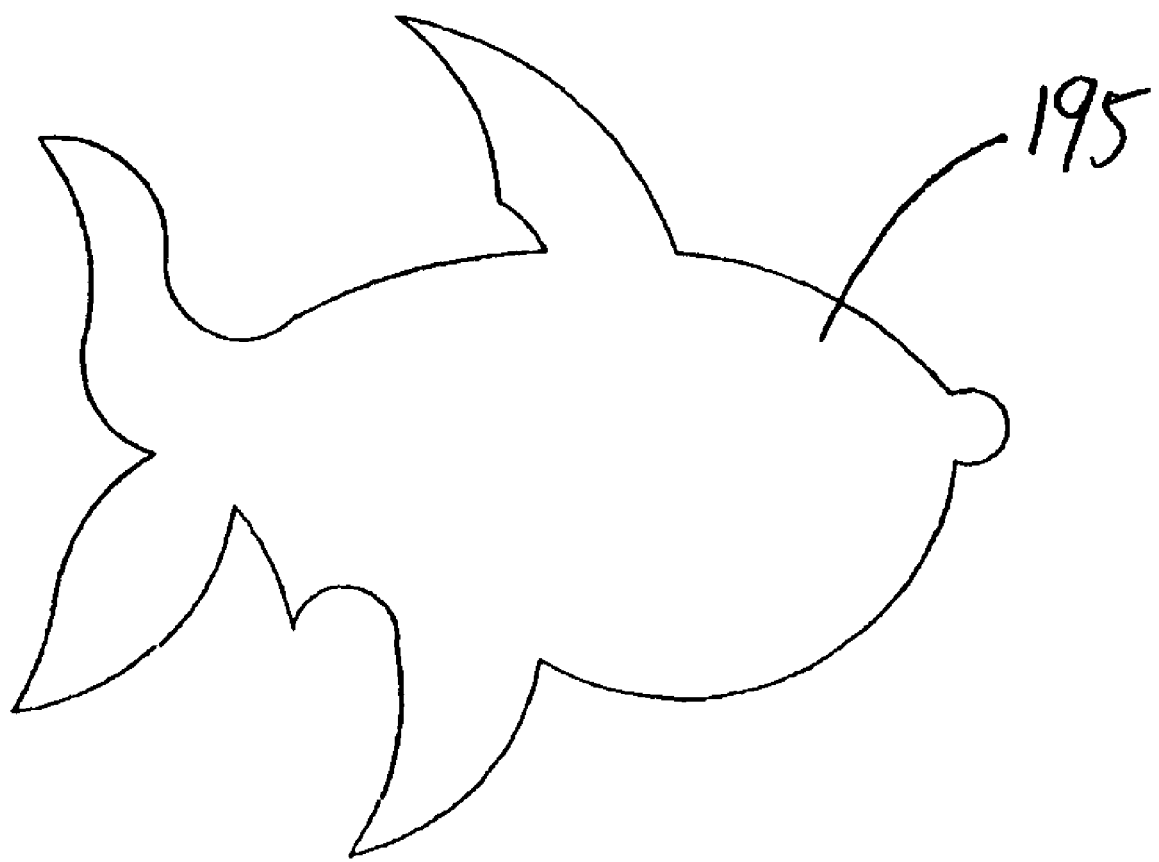
FIGS. 14 and 15 illustrate shaped openings that can be used to extrude a dough-based product shaped like a shark in one embodiment of the present invention.
Figure 15:
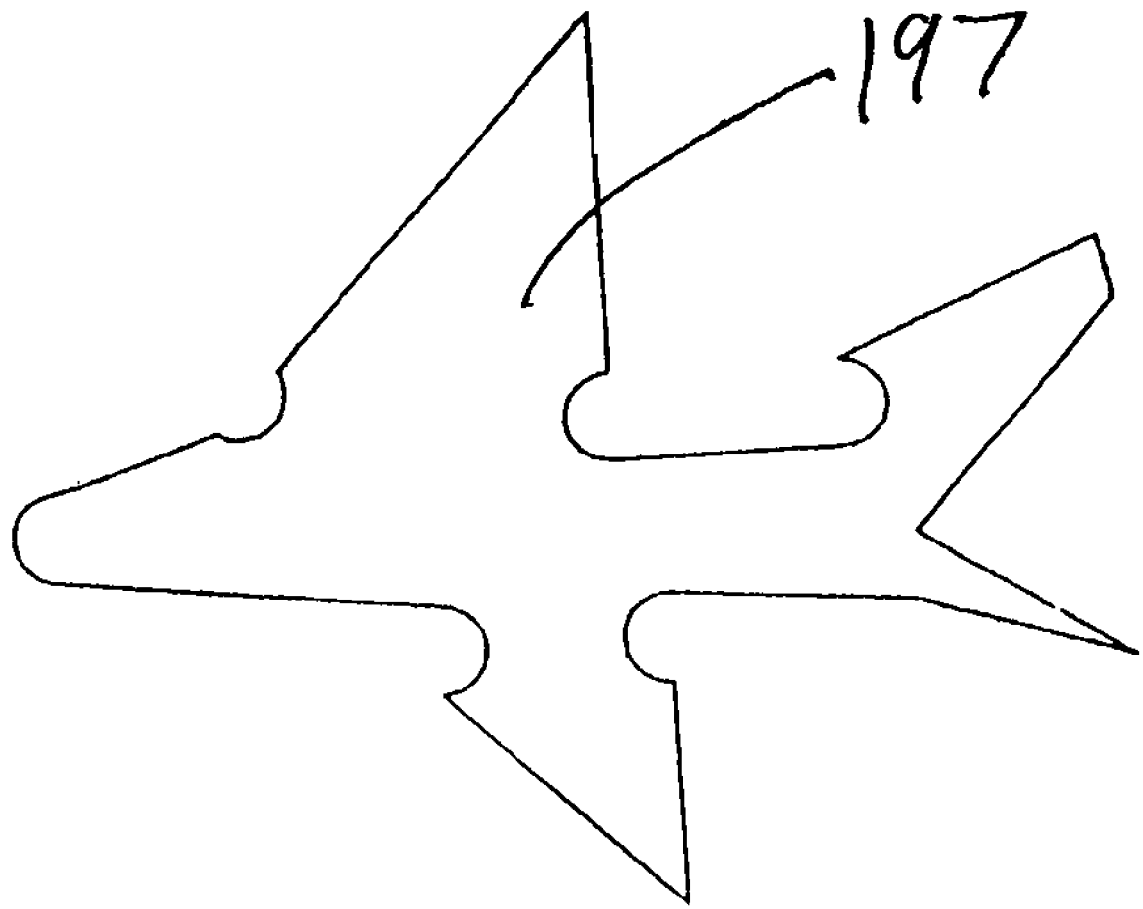

FIGS. 14 and 15 illustrate shaped openings 195, 197 that can be used to extrude a dough-based product shaped like a shark in one embodiment of the present invention. Dough-based products extruded using a dough cutter having such a shaped opening might be popular in connection with aquariums, theme parks, movies, etc.

Shaped openings can also be designed to extrude dough-based products for particular styles of dough-based products, such as, for example, beignets or "long johns." Embodiments of dough cutters of the present invention can incorporate a wide variety of shaped openings depending on the desired shape of the dough-based product.

Shaped dough-based products can also be decorated after extrusion, cutting, and cooking/frying. For example, the dough-based products can be at least partially coated with glaze(s), icing(s), sprinkle(s), and other toppings. For example, the dough-based products can be at least partially coated with icings having a color that is associated with the shape, an event, a team, a holiday, etc. For example, a heart-shaped dough-based product could be at least partially coated with white icing and with red sprinkles or red sugar.

Shell Cutter with Non-Circular Shaped Opening

Figure 16:
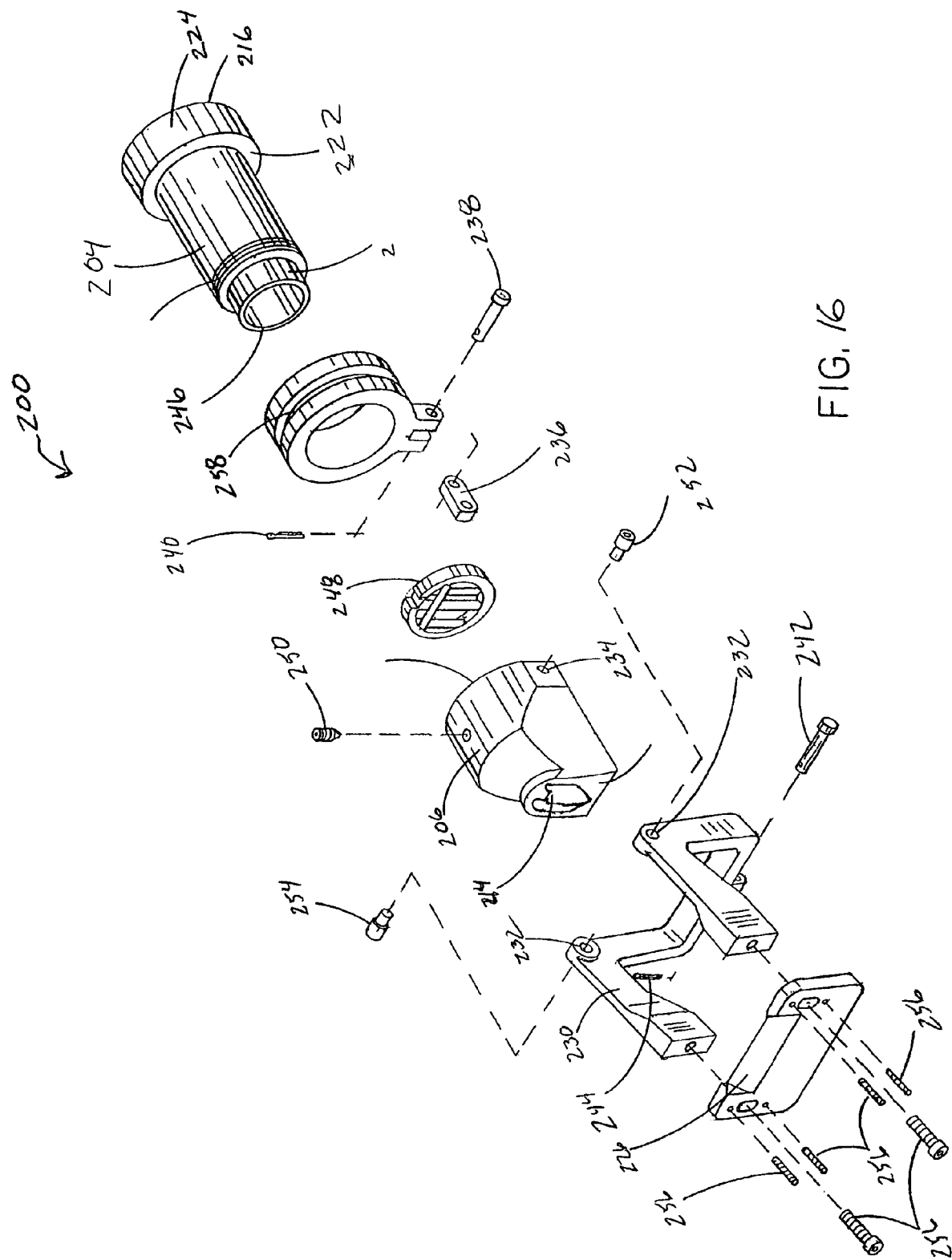
FIG. 16 is an assembly drawing illustrating a dough cutter having a shaped opening in one embodiment of the present invention.

FIG. 16 is an assembly drawing illustrating a dough cutter having a shaped opening in one embodiment of the present invention. The shape of the opening is non-circular in the embodiment shown. For example, the shaped opening may be similar to the shaped openings shown in FIGS. 5 and 9-15.

In some embodiments, the cross-section of a shaped opening used in a dough cutter can have a finite number of lines of symmetry. For instance, one embodiment can have two or less lines of symmetry. In some embodiments, the cross-section of the shaped plate can have one line of symmetry. In other embodiments, the cross-section of the shaped plate can have no lines of symmetry. A line of symmetry is present when a straight line across the cross-section of the shaped plate would divide the shaped plate into two symmetrical portions. For example, a rectangle has two lines of symmetry. A circle has many lines of symmetry, as any line across the diameter of the circle would be a line of symmetry. An isosceles triangle has one line of symmetry, while a scalene triangle has no lines of symmetry. Embodiments of dough cutters of the present invention that utilize shaped openings having two or less lines of symmetry further illustrate advantages of the present invention relating to the ability to form dough-based products having unique shapes.

To assemble the dough cutter 202, the cleavice pin 236 was coupled to the actuator 228 using the pin 238 and cotter key 240. The other end of the cleavice pin 236 is coupled to the yoke 230 using another pin 242 and cotter key 244. The actuator 228 is slid over the first end 246 of the barrel 204. A breaker bar 148 is utilized in the embodiment of the dough cutter 202 shown.

FIG. 17 shows a top elevational view of an embodiment of a breaker bar for use with some non-limiting embodiments of dough cutters of the present invention. The breaker bar 248 is inserted and secured in the head 206 using a screw 250 in this embodiment. The breaker bar 248 assists in distributing the dough as it moves through the head 206. The breaker bar 248 can also assist in de-gassing the dough as it moves through the head 206. Carbon dioxide may continue to form in yeast-raised dough as the dough passes through the dough cutter and the breaker bar 248 can assist in breaking gas bubbles that might form in the dough.

After the breaker bar 248 is secured in the head 206, the head 206 is coupled to the first end 46 of the barrel 204 using their threaded portions. Two screws 252, 254 were used to secure the yoke 230 to the head 206 through holes in the yoke 230 and the head 206. The yoke 230 can pivot at this location to allow the cutting member 226 to slide over the first end 246 of the head 206. The yoke 230 pivots as the actuator 228 slides over at least a portion of the barrel 204.

The cutting member 226 is affixed to the yoke 230 with several screws 256. As the yoke 230 pivots, the cutting member 226 moves across and covers the shaped opening 214 in the head 206.

As noted above, embodiments of dough cutters of the present invention can incorporate a wide variety of shaped openings depending on the desired shape of the dough-based product. For example, the shaped opening 214 shown in FIG. 16 is in the shape of a heart.

FIG. 1 shows the dough cutter 2, which is similar to the dough cutter 202, in an "open" position. Like the dough cutter 2 shown in FIG. 1, when the dough cutter 202 is in the open position, the cutting member 226 is not covering the shaped opening 214. When the dough cutter 202 is installed on an extruder and the cutting member 226 is in this position, dough can flow through the shaped opening 214. In the embodiment shown, the actuator 228 is positioned adjacent the clamp area 222 when the dough cutter 202 is in the open position. When installed, as discussed below, a clamp from an extruder may be positioned between the actuator 228 and the clamp area 222 to secure and cover the dough cutter to the extruder.

In FIG. 2, the cutting member 26 is covering the shaped opening 14. Similarly, the cutting member 226 is covering the shaped opening 214 in FIG. 16 when the cutting member 226 is in a closed position. When the actuator 228 has moved to a position between the clamp area 222 and the head 206. The movement of the actuator 228 pushes the cleavice pin 236 upward, which correspondingly causes the yoke 230 to pivot about screws 252, 254 resulting in the cutting member 226 beginning to slide over the shaped opening 214.

When dough is being extruded through the shaped opening 214, the movement of the cutting member 226 over the shaped opening 214 cuts the extruded dough. In operation, the movement of the actuator 228, the yoke 230, and the cutting member 226 can be fairly rapid and the dough cutter 202 may not pause between an open and closed position in some embodiments of the present invention.

In the closed position, the cutting member 226 is covering the shaped opening 214. When the dough cutter 202 is installed on an extruder and the cutting member 226 is in this position, dough is not able to flow through the shaped opening 214. The actuator 228 is positioned proximate the head 206 when the dough cutter 202 is in the closed position. When the actuator 228 begins sliding toward the clamp area 222 of the barrel 204, the cutting member 20 will also move to again expose the shaped opening 214 such that dough can be extruded through the shaped opening 214.

The movement of the actuator 228 between a position proximate the clamp area 222 of the barrel 204 (or a position proximate a clamp from an extruder that seals the dough cutter to the extruder at the clamp area 222) and a position proximate the head 206 adjusts the position of the cutting member 226 relative to the shaped opening 214 from a position where the cutting member 226 does not cover the shaped opening 214 to a position where the cutting member 226 covers the shaped opening 214. When this embodiment of a dough cutter 202 is used with an extruder, this movement results in the extruding and cutting of dough. Dough is extruded through the shaped opening 214 when the cutting member 226 is open, and the dough being extruded is cut when the cutting member 226 closes. The amount of time that the dough cutter remains open can affect the size of the dough-based product (e.g., the longer the dough cutter remains open, the larger the dough-based product). The surface area of the shape and the air pressure contribute to the overall size of the product.

In the Figures, the dough cutter 202 is shown with the shaped opening 214 pointing upward. The dough cutter 202 is oriented in this manner to better show its different features. In use, the dough cutter 202 would typically be positioned with the shaped opening 214 pointing generally downward in order to utilize gravity in extruding the dough. When the dough cutter is oriented with the shaped opening 214 pointing generally downward, the extruded and cut dough can drop from the dough cutter 202 onto a tray, a conveyor, or other surface.

To orient the dough cutter 202 with the shaped opening 214 pointing generally downward, the dough cutter 202 can be positioned at the bottom of an extruder tank. U.S. Pat. No. 6,511,689 illustrates in FIG. 2 how dough cutters (referred to as extruding mechanisms 25 in the '689 patent) can be positioned relative to an extruder tank (referred to as tank 12 in the '689 patent). The dough leaving an extruder tank enters the second end 16 of the barrel 204, travels through the barrel 204 and out the shaped opening 214. The dough cutter 202 can be clamped into positioned at the bottom of the tank using the clamp area 22. A clamp or similar device can hold the barrel 204 between the clamp area 222 and the actuator 228. For example, the clamp or similar device can form an annulus having a diameter that is larger than the diameter of the longest portion of the barrel 204, but smaller than the diameter of the clamp area 22, such that the clamp area 222 cannot slide through the annulus. The clamp can be positioned between the actuator 228 and the clamp area 222, such that the actuator 228 does not rest against the clamp area 222.

The dough cutter 202 can be sealed to the extruder tank at a seal area at the end 224 of the barrel 204. While the term sealed is used, it should be understood that the seal area is positioned proximate to the bottom of the extruder tank in a manner that reduces the likelihood of dough or air escaping through a gap between seal area and the extruder tank. If a pressurized tank is used to push the dough through the shaped opening 214, it can be important to maintain the pressure of the tank so that the desired weight of dough is extruded and cut. Thus, the connection between the dough cutter 202 and the extruder tank can be important in the avoidance of leaks.

When installed on an extruder, the extruder can include a bung or similar protrusion that extends vertically downward from the extruder tank into the second end 216 of the barrel 204. Dough can flow from a tank on the extruder through the bung and into the dough cutter. A clamp on the extruder can secure the barrel 204 (and the entire dough cutter when assembled) to the extruder when it is tightened on the clamp area 222. The clamp seals the dough cutter to the extruder. An extruder can include a plurality of bungs or protrusions such that multiple dough cutters (e.g., one dough cutter for each bung or protrusion) can be installed.

An actuator grip from the extruder can be coupled to the actuator 228 on the dough cutter. For example, the actuator grip can be a u-shaped or horseshoe-shaped device that can slide into a groove 258 of the actuator 228, such that vertical movement of the actuator grip can move the actuator 228 upwardly or downwardly. The actuator grip, in some embodiments, can be coupled to a bar or shaft on the extruder that rotates to move the actuator grip. For example, the shaft can be oriented horizontally (e.g., the length of the shaft is horizontal), and the shaft can rotate on its horizontal axis. The actuator grip can be approximately perpendicular to the horizontal shaft such that rotation of the shaft in one direction moves the actuator grip (and hence the actuator 228) upward and rotation of the shaft in the opposite direction can move the actuator grip (and hence the actuator 228) downward. When multiple dough cutters are installed on the same extruder, an actuator grip associated with each dough cutter can also be coupled to the horizontal shaft. The horizontal shaft can move each of the actuators in unison so that the dough-based products from each dough cutter are extruded and cut at approximately the same time.

In some embodiments, when installed, the dough cutter 202 can start in the closed position (e.g., with the cutting member blocking the shaped opening). To extrude a dough-based product, the horizontal shaft rotates in one direction, which in turn moves the actuator grip and the actuator 228 upward. The actuator 228 moves toward the clamp area 222 of the barrel 204, which results in the cutting member 226 sliding off of the shaped opening 214 to allow dough to be extruded through the shaped opening 214. To cut the extruded dough, the horizontal shaft rotates in the opposite direction, which in turn moves the actuator grip and the actuator downward. The actuator 228 moves away from the clamp area 222 of the barrel 204, which results in the cutting member 226 sliding over the shaped opening 214 to cut the extruded dough. In some embodiments, the dough cutter remains in the closed position when the extruder is not in operation.

The embodiments of dough cutters shown in FIGS. 1-16 can be used to produce doughnut shells. As noted above, doughnut shells can be filled with jelly, custard, whipped cream, or other fillings in some embodiments. In some embodiments, doughnut shells can be filled with jelly, custard, whipped cream, or other fillings and/or at least partially coated with glaze(s), icing(s), sprinkle(s), and other toppings. In other embodiments, the shells may be left unfilled.

The shell cutters described herein may be used to cut a variety of dough-based products. Examples of dough-based products that may be formed using the methods and apparatuses of the present invention include, without limitation, doughnuts, ring doughnuts, doughnut shells, doughnut holes, doughnut twists, beignets, long johns, and cinnamon rolls.

Dough cutters of the present invention can be constructed from a number of materials. Because dough cutters are used in preparing food, the dough cutters are preferably constructed from food-grade materials. A number of food-grade materials can be used to construct dough cutters of the present invention including, without limitation, stainless steel, plastic, nylon, or other food-grade composites.

The metal components of embodiments of dough cutters of the present invention can be machined using an electrical discharging machining (EDM) system. Such systems are commercially available from Agie Ltd. of Lincolnshire, Ill. An example of a suitable EDM system is the Agiecut Classic 2S, commercially available from Agie Ltd. Similar technology, such as water jet cutting machines, can be used to make the components of dough cutters of the present invention. Such machines can precisely make the components, which can be important when machining dough cutters of the present invention designed to extrude and cut dough-based products having fairly complex shapes.

An EDM system can receive instructions for machining the components from a computer. For example, dough cutters can be designed using computer software, such as AUTOCAD from Autodesk, Inc., and the EDM system can receive the specifications from AUTOCAD and cut the various components of the dough cutters.

The thermoplastic components of embodiments of dough cutters of the present invention can be machined using a various cutting machines, such as a water jet cutting machine or a Computer Numerically Controlled (CNC) Bridgeport Series #2. Other types of suitable cutters may also be used.

After assembly and prior to use, a lubricant can be applied to dough cutters of the present invention. The lubricant can also be added during operation as needed to facilitate movement of the various components of the dough cutters. Lubricant can be applied to ring cutters and shell cutters of the present invention using techniques known to those of skill in the art. For example, lubricant can be sprayed on the dough cutters prior to use. The lubricants can be food-grade oil lubricants. An example of a lubricant useful in embodiments of the present invention is K-Lube Mineral Oil USP, which is available from Mallet & Company of Carnegie, Pa.

Embodiments of dough cutters of the present invention can be used to produce dough-based products having a variety of shapes. The ability to produce dough-based products having different shapes can provide unique marketing opportunities to manufacturers and sellers of dough-based products. The various product shapes and designs available could intrigue consumers. For example, manufacturer and sellers of dough-based products might generate consumer interest by selling dough-based products in shapes associated with holidays, events, sports teams, locations, companies, cities, states, television programs, movies, characters, books, etc.

The embodiments of shaped openings shown herein should not be viewed as limiting the present invention to a particular design or a particular shape of dough-based products. Shaped openings for the extrusion and cutting of dough-based products having other shapes can be designed based on the shaped openings shown and described herein.

GENERAL

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A dough cutting apparatus comprising:
   a barrel having a substantially cylindrical shape comprising a center axis, wherein the barrel comprises a first end and a second end, wherein the first end and second end are positioned along the center axis and are substantially coaxial, wherein the second end of the barrel is configured to be coupled to a tank configured to contain dough to be extruded through the barrel and wherein the barrel is configured such that the dough travels from the second end of the barrel and exits to the barrel through the first end;
   a removable die comprising a shaped opening, wherein the removable die is adapted to be coupled to the first end of the barrel by sliding the removable die onto the first end of the barrel in a direction substantially perpendicular to the center axis of the barrel; and
   a knife adapted to cut dough extruded from the shaped opening.

2. The dough cutting apparatus of claim 1, further comprising a head having two ends, a first end of the head being adapted to receive the removable die and a second end of the head being coupled to the first end of the barrel between the barrel and the removable die.

3. The dough cutting apparatus of claim 1, further comprising an o-ring adapted to seal the removable die and the first end of the barrel.

4. The dough cutting apparatus of claim 1, wherein the knife is further adapted to slide over the removable die between a first position which substantially covers the shaped opening of the removable die and a second position in which the shaped opening is not covered.

5. The dough cutting apparatus of claim 1, wherein the shaped opening is adapted to produce a shaped dough product having one of the following shapes: a cartoon mouse, a cinnamon bun, a football, a Christmas tree, a beignet, a shamrock, a ribbon, and a profile of a rabbit.

6. The dough cutting apparatus of claim 1, wherein the shaped opening has a finite number of lines of symmetry.

7. The dough cutting apparatus of claim 6, wherein the shaped opening has a single line of symmetry.

8. The dough cutting apparatus of claim 1, wherein the shaped opening has no lines of symmetry.

9. The dough cutting apparatus of claim 1, wherein the removable die comprises a thermoplastic.

10. The dough cutting apparatus of claim 9, wherein the thermoplastic comprises an acetal resin.

11. The dough cutting apparatus of claim 10, wherein the acetal resin comprises an acetal copolymer.

12. The dough cutting apparatus of claim 9, wherein the thermoplastic comprises crystalline thermoplastic polyester.

13. The dough cutting apparatus of claim 1, further comprising a die insert adapted to be held proximate to the removable die.

14. The dough cutting apparatus of claim 1, wherein the removable die comprises at least one pin and the first end of the barrel comprises at least one corresponding groove.

15. The dough cutting apparatus of claim 2, wherein the head comprises a thread and the barrel comprises a complimentary thread.

16. The dough cutting apparatus of claim 1, further comprising an actuator adapted to slide over at least a portion of the barrel, wherein the actuator is coupled to the knife.

17. The dough cutting apparatus of claim 16, wherein the actuator is coupled to the knife by a yoke, wherein the yoke is coupled to the knife and to the barrel and wherein the sliding of the actuator adjusts the position of the knife relative to the shaped opening.

18. A method for making doughnuts comprising:
extruding and cutting the dough with the dough cutting apparatus of claim 1; and
cooking the dough.

19. A dough cutting apparatus comprising:
a barrel having a substantially cylindrical shape comprising a center axis, wherein the barrel comprises a first end and a second end, wherein the first end and second end are positioned along the center axis and are substantially coaxial, the second end of the barrel is configured to be coupled to a tank configured to contain dough, wherein the barrel is configured such that dough travels in a vertically linear direction from the second end of the barrel and exits the barrel through the first end; a head coupled to the first end of the barrel and comprising a center axis;
a removable die comprising a shaped opening, wherein the removable die is adapted to be coupled to the head by sliding the removable die onto the head in a direction substantially perpendicular to the center axis of the head; and
a knife adapted to cut dough extruded from the shaped opening.

20. The dough cutting apparatus of claim 19, wherein the knife is further adapted to slide over the shaped opening between a first position which substantially covers the shaped opening and a second position in which the shaped opening is not covered.

21. The dough cutting apparatus of claim 19, further comprising an actuator adapted to slide over at least a portion of the barrel, wherein the actuator is coupled to the knife.

22. The dough cutting apparatus of claim 21, wherein the actuator is coupled to the cutting member by a yoke, wherein the yoke is coupled to the knife and to the barrel and wherein the sliding of the actuator adjusts the position of the knife relative to the shaped opening.

23. The dough cutting apparatus of claim 19, further comprising a second end of the dough extruder adapted to be held proximate to a tank containing dough to be extruded.

24. The dough cutting apparatus of claim 19, wherein the head comprises a thread and the barrel comprises a complimentary thread.

25. A dough cutting apparatus comprising:
a barrel having a first end and a second end, wherein the barrel comprises a substantially cylindrical structure having a central axis such that the first end and the second end are positioned about the central axis and are substantially coaxial, and wherein the first end is the outlet end of the barrel through which dough exits the barrel;
a removable die comprising a shaped opening, wherein the removable die is adapted to be coupled to the first end of the barrel by sliding the removable die onto the first end of the barrel in a direction substantially perpendicular to the central axis through the barrel; and
a knife adapted to cut dough extruded from the shaped opening.

26. The dough cutting apparatus of claim 19, wherein the shaped opening has a finite number of lines of symmetry.

* * * * *

UNITED STATES PATENT AND TRADEMARK OFFICE
CERTIFICATE OF CORRECTION

| | | |
|---|---|---|
| PATENT NO. | : 8,002,534 B2 | Page 1 of 1 |
| APPLICATION NO. | : 11/227743 | |
| DATED | : August 23, 2011 | |
| INVENTOR(S) | : Stanley N. Lowry and Garcie M. McCall and Christopher T. Roth | |

It is certified that error appears in the above-identified patent and that said Letters Patent is hereby corrected as shown below:

Col. 18, Claim 1, Line 10, Please delete the word "to", so reads -end of the barrel and exits the barrel through the first end- Signed and Sealed this
First Day of November, 2011

David J. Kappos
*Director of the United States Patent and Trademark Office*